Figure 1:
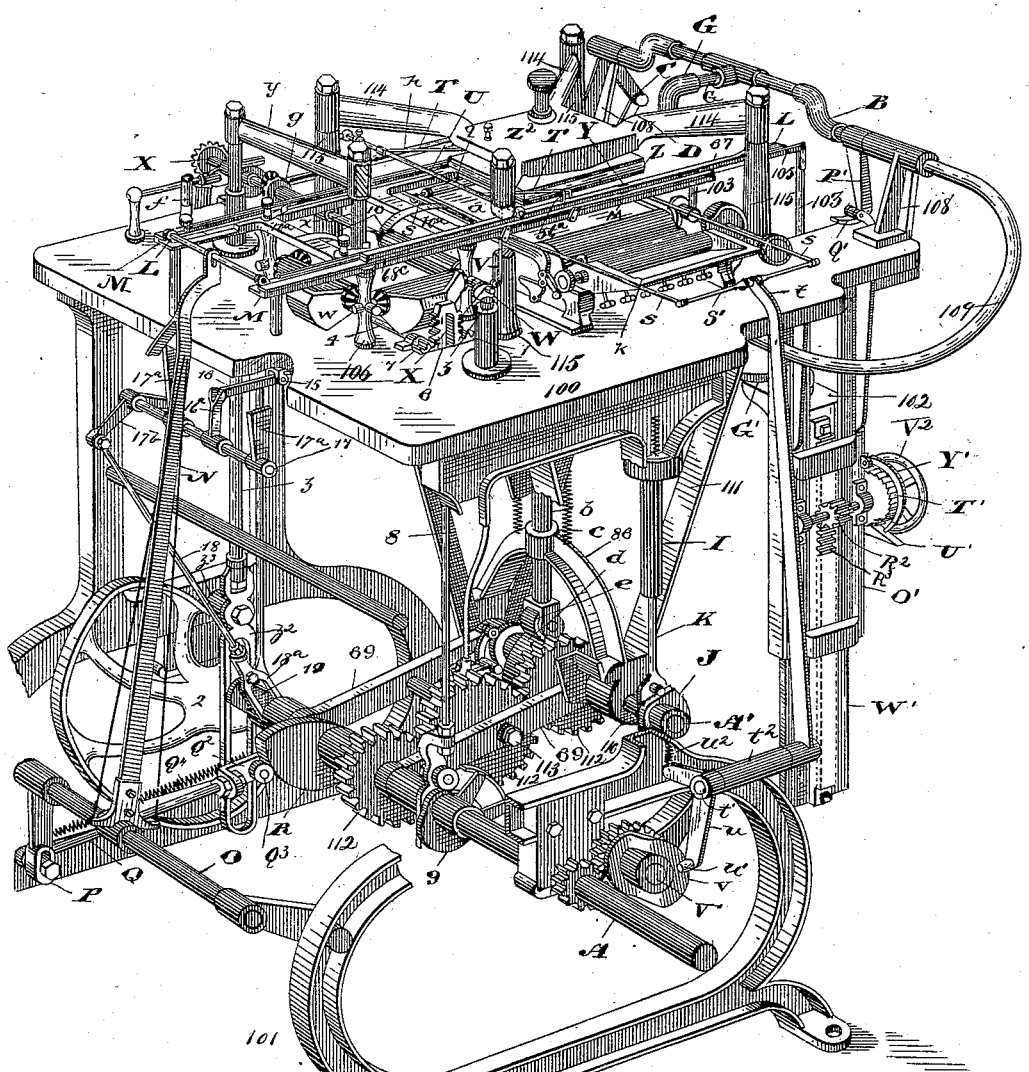

(No Model.) 15 Sheets—Sheet 1.

J. W. HUTT & A. J. PHILLIPS.
MACHINE FOR MANUFACTURE OF PAPER VESSELS.

No. 537,289. Patented Apr. 9, 1895.

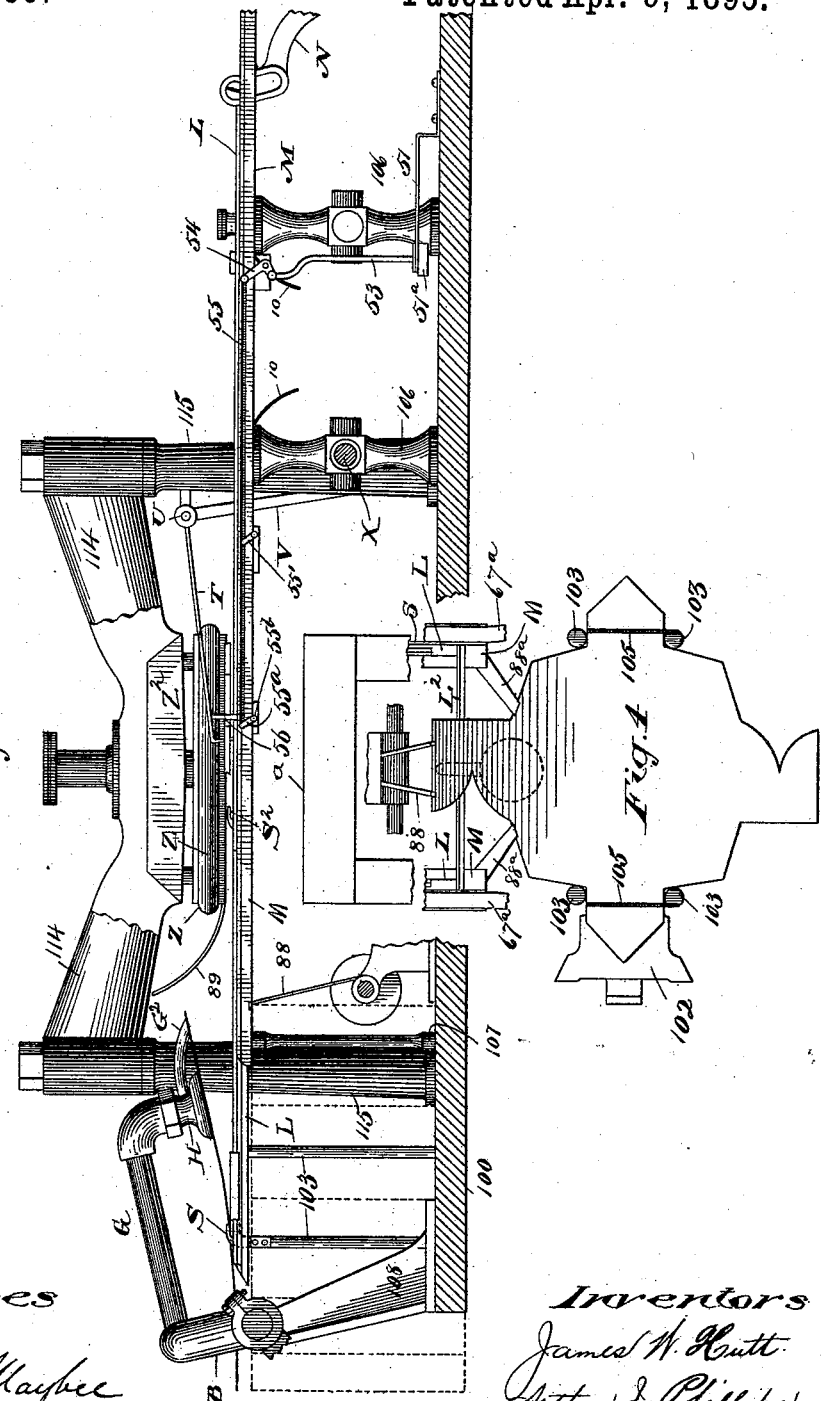

(No Model.) 15 Sheets—Sheet 4.

J. W. HUTT & A. J. PHILLIPS.
MACHINE FOR MANUFACTURE OF PAPER VESSELS.

No. 537,289. Patented Apr. 9, 1895.

Witnesses
J. Edw. Maybee
W. G. McMillan

Inventors
James W. Hutt
Arthur J. Phillips
by Donald C. Ridout & Co.
Attys.

(No Model.) 15 Sheets—Sheet 5.
J. W. HUTT & A. J. PHILLIPS.
MACHINE FOR MANUFACTURE OF PAPER VESSELS.

No. 537,289. Patented Apr. 9, 1895.

Witnesses

Inventors
James W. Hutt
Arthur J. Phillips
by Donald C. Ridout & Co.
Attys (No Model.) 15 Sheets—Sheet 6.
J. W. HUTT & A. J. PHILLIPS.
MACHINE FOR MANUFACTURE OF PAPER VESSELS.
No. 537,289. Patented Apr. 9, 1895.
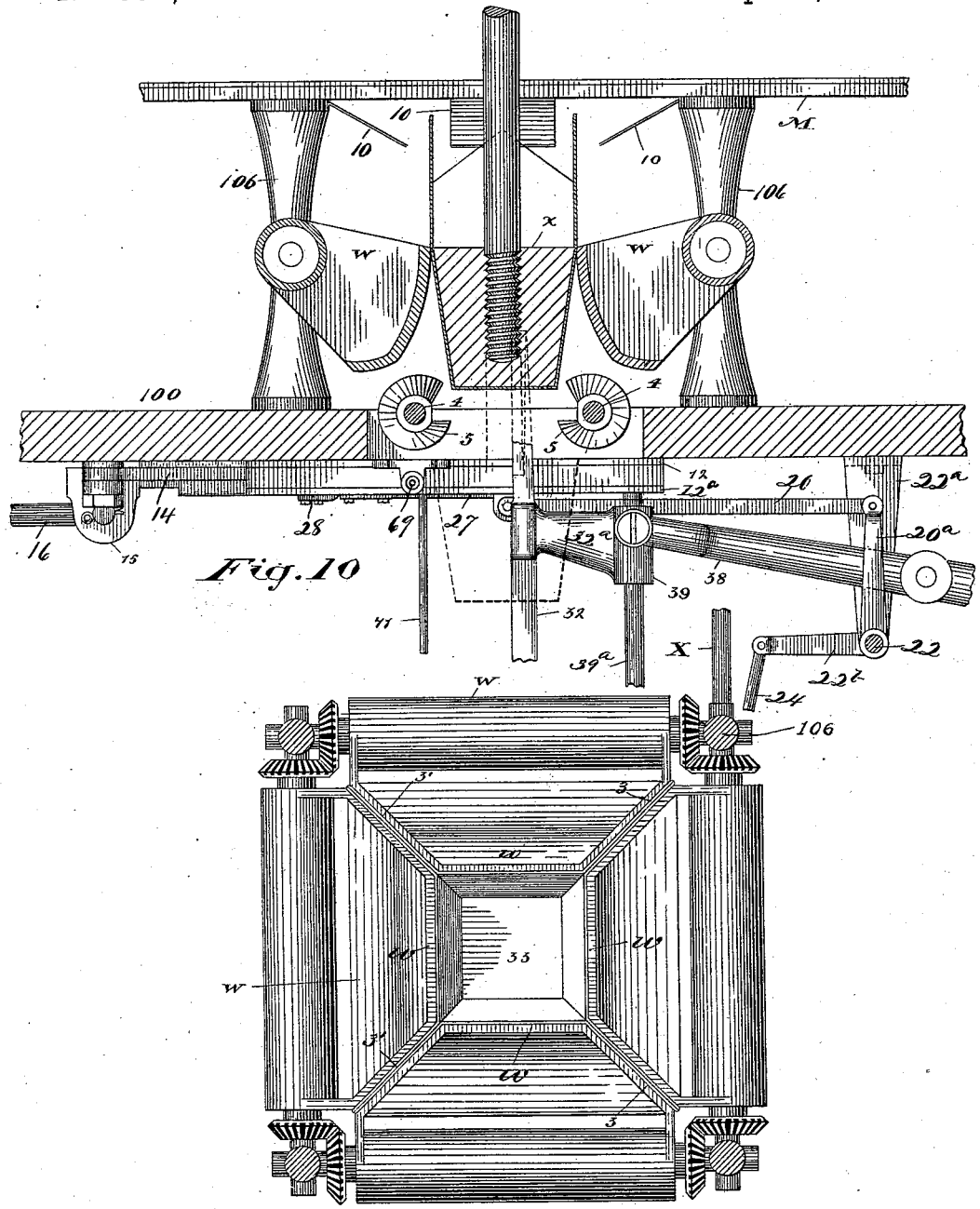
Witnesses  Fig.11  Inventors
J. Edw. Maybee  James W. Hutt
N. G. McMillan.  Arthur J. Phillips
by Donald C. Ridout & Co.
Attys.

(No Model.) 15 Sheets—Sheet 7.

J. W. HUTT & A. J. PHILLIPS.
MACHINE FOR MANUFACTURE OF PAPER VESSELS.

No. 537,289. Patented Apr. 9, 1895.

Witnesses
J. Edw. Maybee
W. G. McMillan

Inventors
James W. Hutt
Arthur J. Phillips
by Donald C. Ridout & Co
attys

THE NORRIS PETERS CO., PHOTO-LITHO., WASHINGTON, D. C.

(No Model.)  15 Sheets—Sheet 8.

J. W. HUTT & A. J. PHILLIPS.
MACHINE FOR MANUFACTURE OF PAPER VESSELS.

No. 537,289.  Patented Apr. 9, 1895.

Witnesses  Inventors (No Model.) 15 Sheets—Sheet 10.
J. W. HUTT & A. J. PHILLIPS.
MACHINE FOR MANUFACTURE OF PAPER VESSELS.
No. 537,289. Patented Apr. 9, 1895.

Witnesses
J. Edw. Maybee
W. G. McMillan

Inventors
James W. Hutt
Arthur J. Phillips
by Donald C. Ridout & Co.
Attys.

(No Model.) 15 Sheets—Sheet 11.
J. W. HUTT & A. J. PHILLIPS.
MACHINE FOR MANUFACTURE OF PAPER VESSELS.
No. 537,289. Patented Apr. 9, 1895.
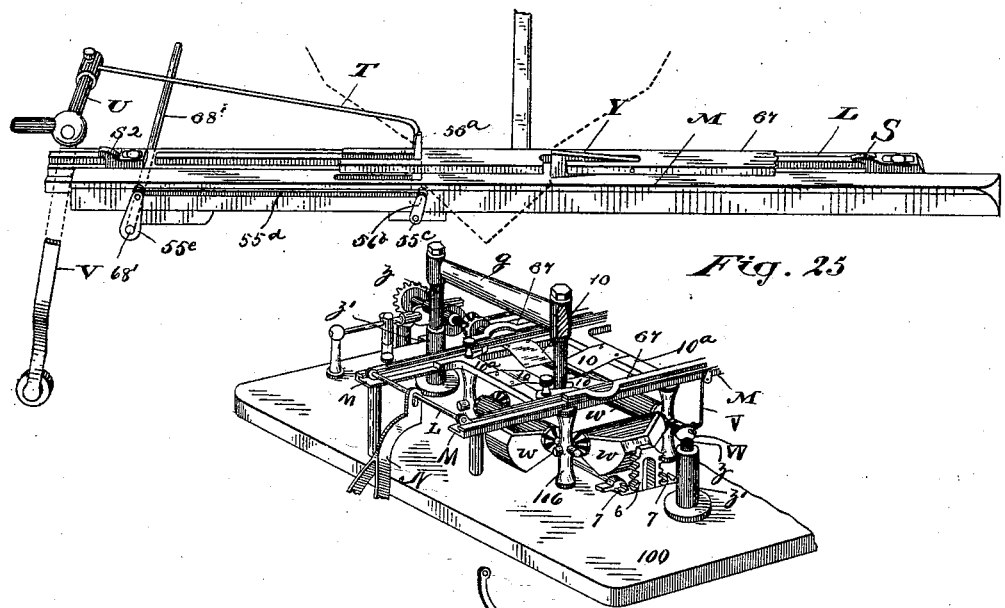
Fig. 25
Fig. 26
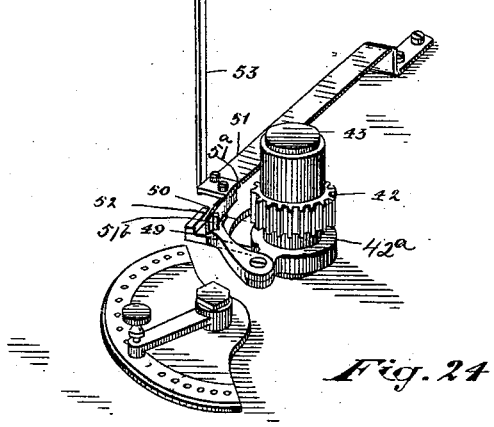
Fig. 24
Witnesses
J. Edw. Maybee
N. G. McMillan
Inventors
James W. Hutt
Arthur J. Phillips
by Donald C. Ridout & Co.
Attys.

(No Model.) 15 Sheets—Sheet 12.

J. W. HUTT & A. J. PHILLIPS.
MACHINE FOR MANUFACTURE OF PAPER VESSELS.

No. 537,289. Patented Apr. 9, 1895.

Witnesses
J. Edw. Maybee
W. G. McMillan

Inventors
James W. Hutt
Arthur J. Phillips
by Donald C. Ridout & Co.
attys.

(No Model.) 15 Sheets—Sheet 13.
J. W. HUTT & A. J. PHILLIPS.
MACHINE FOR MANUFACTURE OF PAPER VESSELS.
No. 537,289. Patented Apr. 9, 1895.
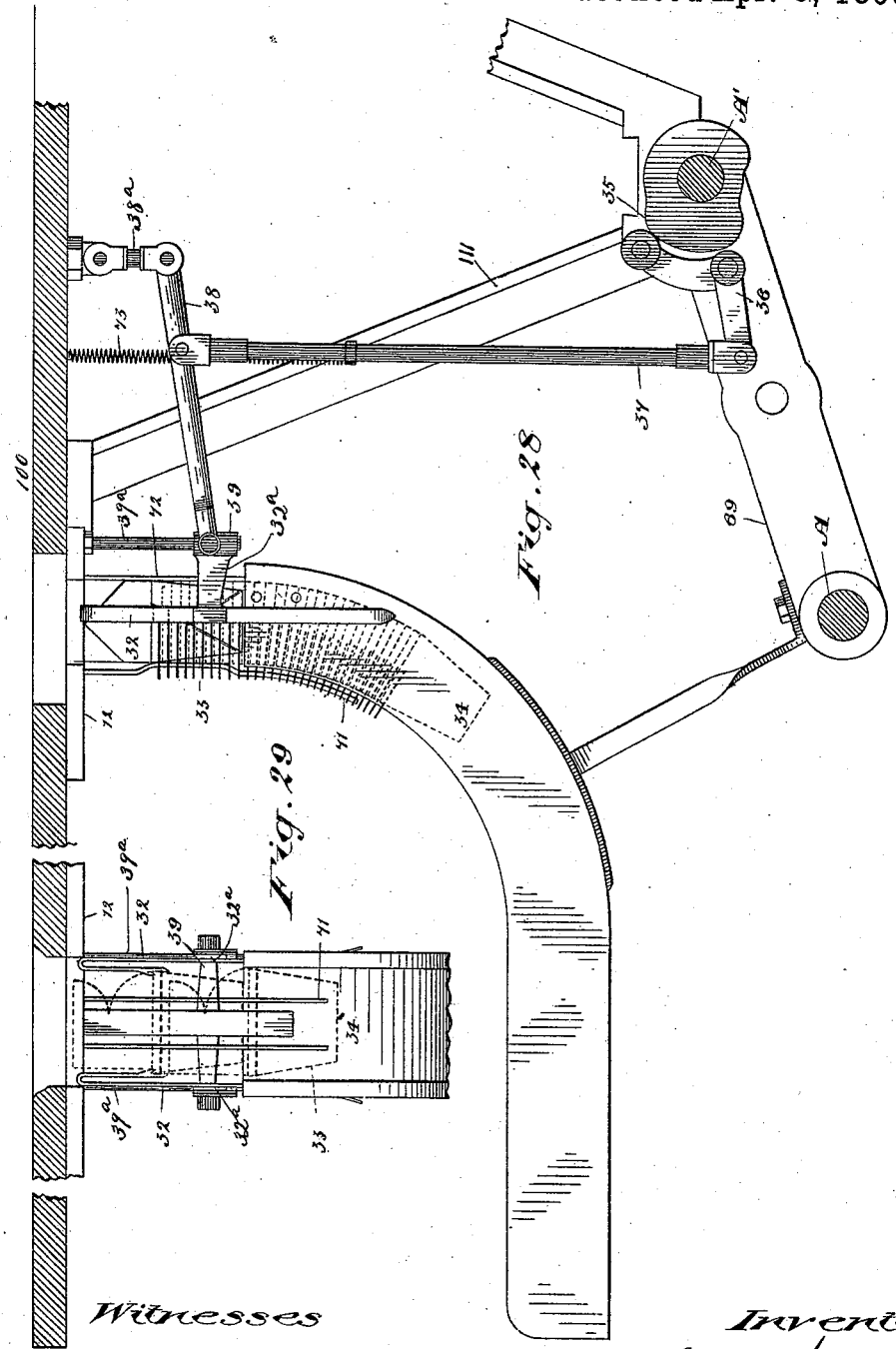
Witnesses
J. Edw. Maybee
W. G. McMillan
Inventors
James W. Hutt
Arthur J. Phillips
by Donald C. Ridout & Co.
Attys.

(No Model.) 15 Sheets—Sheet 14.

J. W. HUTT & A. J. PHILLIPS.
MACHINE FOR MANUFACTURE OF PAPER VESSELS.

No. 537,289. Patented Apr. 9, 1895.

Witnesses
Martin W. Olsen
John Leo Jay

Inventors
James W. Hutt
Arthur J. Phillips
by Edward Rector
their atty (No Model.) 15 Sheets—Sheet 15.

J. W. HUTT & A. J. PHILLIPS.
MACHINE FOR MANUFACTURE OF PAPER VESSELS.

No. 537,289. Patented Apr. 9, 1895.

Witnesses
Martin H. Olsen.
John Leo Fay

Inventors
James W. Hutt
Arthur J. Phillips
by Edward Rector
their atty

UNITED STATES PATENT OFFICE.

JAMES W. HUTT AND ARTHUR J. PHILLIPS, OF TORONTO, CANADA, ASSIGNORS, BY MESNE ASSIGNMENTS, TO THE J. W. SEFTON MANUFACTURING COMPANY, OF ANDERSON, INDIANA, AND CHICAGO, ILLINOIS.

MACHINE FOR MANUFACTURE OF PAPER VESSELS.

SPECIFICATION forming part of Letters Patent No. 537,289, dated April 9, 1895.

Application filed January 2, 1891. Serial No. 376,508. (No model.)

*To all whom it may concern:*

Be it known that we, JAMES WILLIAM HUTT and ARTHUR JAMES PHILLIPS, of the city of Toronto, in the county of York, in the Province of Ontario, in the Dominion of Canada, have invented a certain new and useful Machine for the Manufacture of Paper Vessels, of which the following is a description, reference being had to the accompanying drawings, forming part of this specification.

While our invention in some of its features is adapted to the manufacture of a variety of paper vessels, it is designed more particularly for the production of paper pails or buckets, of that class which are provided with wire bails or handles by which they may be carried.

It has for its object the production of a machine by which such paper vessels can be manufactured with the employment of as little manual labor as possible, and consequently more economically than by the hand methods heretofore generally practiced, and more particularly the production of a machine by which the paper blanks for such vessels may be folded into vessel shape and the wire bails formed and attached to them by the automatic operation of the machine, without the interposition of manual labor.

To this end the machine consists chiefly of a folding mechanism, for folding the blanks into vessel shape, and a bailing mechanism, for forming the wire bails and attaching them to the folded blanks, so combined with each other that the blanks may be supplied to the folding mechanism and the completed vessels be delivered from the bailing mechanism without any intermediate manual handling of the folded blanks or vessels. The blanks may be fed to the folding mechanism by hand, or automatic feeding devices operated by the machine may be combined with the folding mechanism for that purpose. So, too, the blanks may be supplied directly to the folding mechanism, either by hand or by the automatic feeding devices, or they may be first delivered to a printing mechanism, by hand or by the feeding devices, and after being printed in the manner desired be automatically advanced to the folding mechanism. The complete machine which we have organized embodies all four of these mechanisms in combination, in such manner that the blanks are taken one by one from a pile placed in proper position within reach of the automatic feeding devices and advanced in succession to the printing, folding and bailing mechanisms and by them printed, folded and bailed, and the completed vessels delivered from the machine in compact order with each vessel fitting snugly within the one preceding it.

The novelty of the invention consists in the various combinations of these different mechanisms, and in the modes of operation of such combinations, as well as in the combination of all four of them in one machine; and also in the construction, arrangement and mode of operation of the parts making up the several mechanisms individually considered; all as will be hereinafter set forth and partcularly pointed out in the claims.

We are aware that it has heretofore been proposed to mechanically form wire bails and apply them to paper vessels, (instead of doing the work manually,) and that a machine has been devised for the purpose, as exhibited in Patent No. 519,153 to Foglesong. The Foglesong machine consists of a secondary or refolding mechanism, in which blanks previously folded in another machine are placed and re-folded to vessel shape, and a bailing mechanism by which the wire bails are formed and attached to the folded blanks. The folding mechanism of this machine is not capable of folding the vessels from flat previously unfolded blanks, but requires that the blanks be first folded in another machine, so that when removed therefrom and placed in the re-folding mechanism of the bailing machine they will readily assume vessel shape under the action of the secondary or re-folding devices. So, too, owing to the shape assumed by the blanks when removed from the first or primary folding machine (spreading out somewhat toward flat form) it is not practicable in the Foglesong machine to automatically feed the blanks to the machine, nor can they be readily fed thereto by means of a reciprocating carrier upon which they might be placed one by one by hand. The result is, that so far as said machine has been developed, it is not only necessary to first fold the blanks in a separate machine, but also to feed such previously folded blanks directly to the re-folding mechanism of the machine by hand. Furthermore, the folding mechanism of the Foglesong machine is such that the folded blanks cannot be passed through it and the completed vessel be automatically ejected or delivered from the bailing mechanism when the bail has been attached, but it is necessary, not only to feed the blank to the folding mechanism by hand, but to remove it therefrom by hand after it has been folded and the bail attached to it. With the Foglesong machine, therefore, the operation of forming complete bailed vessels from flat previously unfolded blanks as they come from the cutting machine consists in first placing the blank in the separate primary folding machine, removing it therefrom when it has been folded and placing it by hand in the re-folding mechanism of the Foglesong machine, and, finally, removing it therefrom by hand when the wire bail has been formed and attached by the bailing mechanism. The operation thus involves three manual handlings of the blank.

In our machine the blanks are delivered in flat unfolded form to the folding mechanism of the machine, and passed directly through the machine, so that no matter what sort of ejecting mechanism may be employed the completed vessels are automatically delivered from the machine and do not have to be removed therefrom one by one by hand. Furthermore, even if the mechanism for automatically placing the blanks one by one upon the reciprocating carrier be dispensed with, and the blanks be placed upon the carrier directly by hand, or even if the carrier be dispensed with and the blanks be placed directly beneath the plunger of the folding mechanism by hand, there is only one manual handling of the blanks required for the conversion of flat unfolded blanks into complete bailed vessels, and with the guide chute arranged beneath the folding and bailing mechanisms the completed vessels as they are delivered from the machine are automatically nested snugly one within another ready for shipment.

In its broader features, therefore, our machine embodies two radical improvements upon the Foglesong machine. First, the flat unfolded blanks, just as they come from the cutting machine, are automatically folded into vessel shape and the wire bails applied to them in one and the same machine, and the separate folding machine and separate folding operation are dispensed with; and, second, the completed vessels are automatically delivered from the machine, instead of being removed therefrom one by one by hand. Either of these improvements might be employed without the other, but in our machine hereinafter described both are employed.

So far as we are aware we are the first in the art to automatically form a complete wire-bailed paper vessel from a flat unfolded blank by any sort of mechanism, and consequently the first to combine any sort of folding mechanism with any sort of bailing mechanism in such manner as to produce this result; as well as the first to produce a machine having the various other operations and capabilities heretofore referred to and hereinafter described and set forth in our claims.

Having thus distinguished our invention in its general features from the machine of the prior art which most nearly approaches it, we will now proceed to a detailed description of the machine by which our invention has been illustrated in the accompanying drawings, in which—

Figure 2:
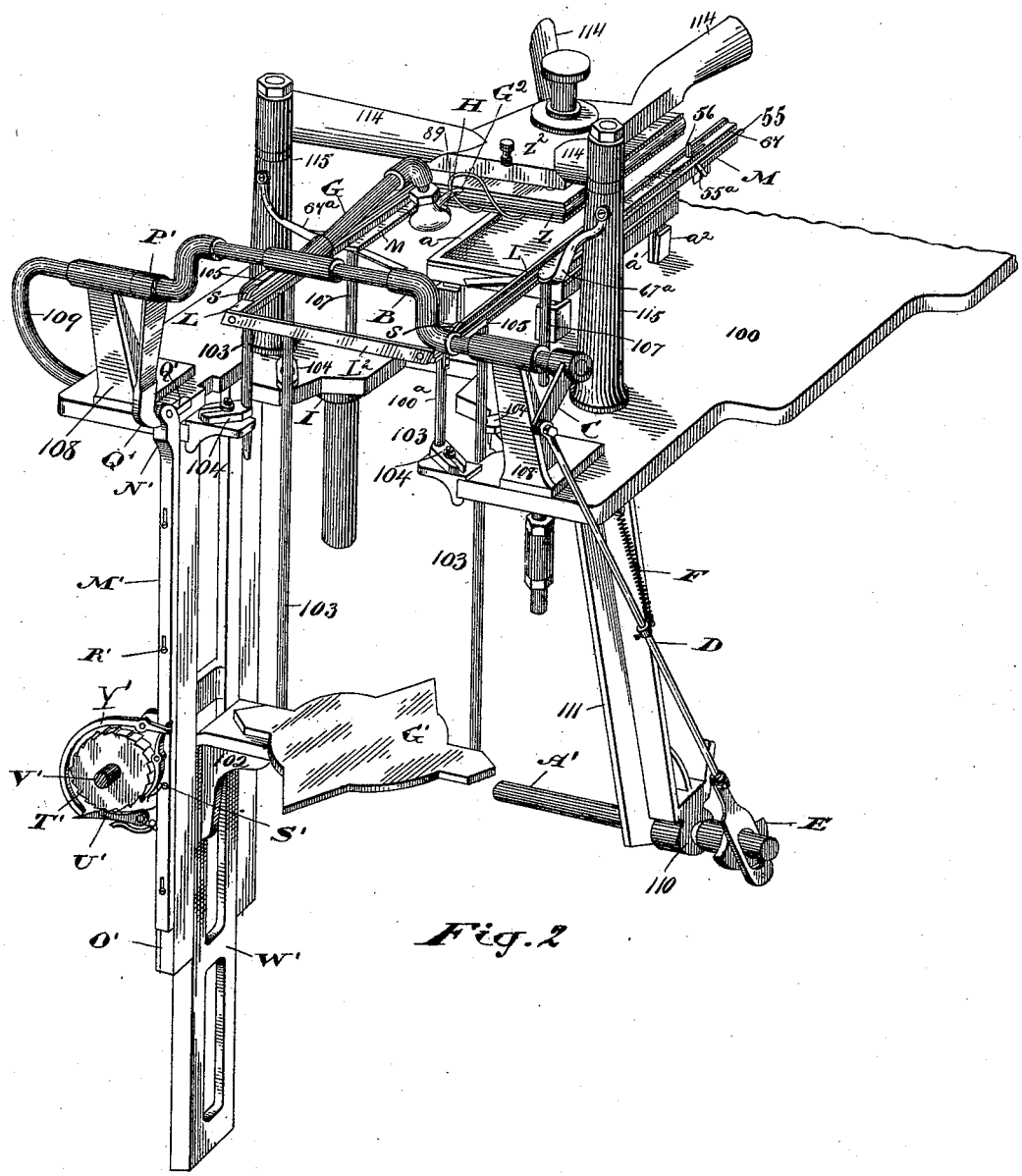
Figure 5:
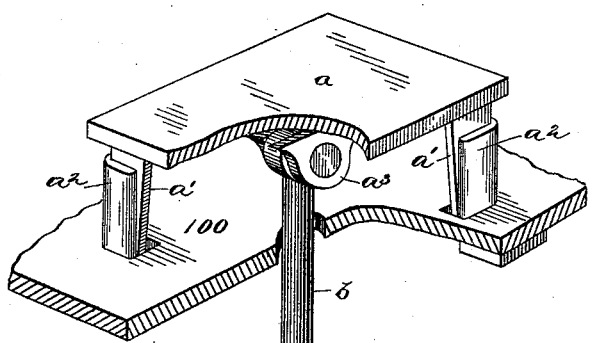
Figure 6:
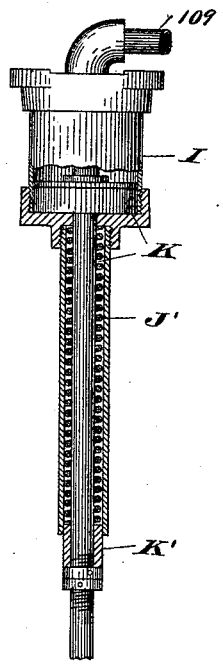
Figure 18:
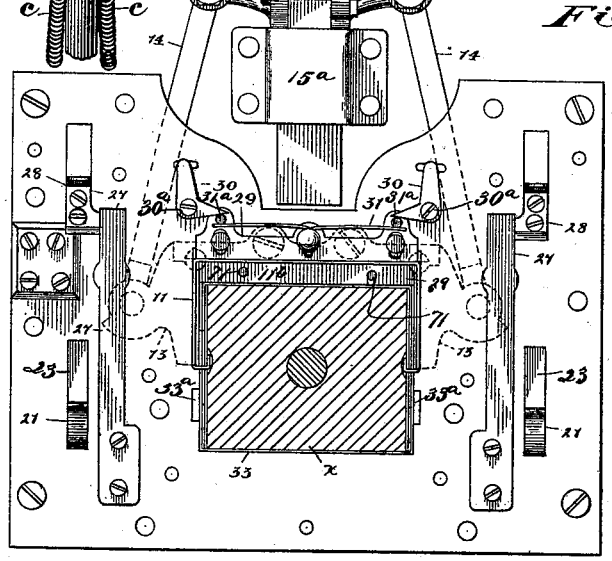
Figure 7:
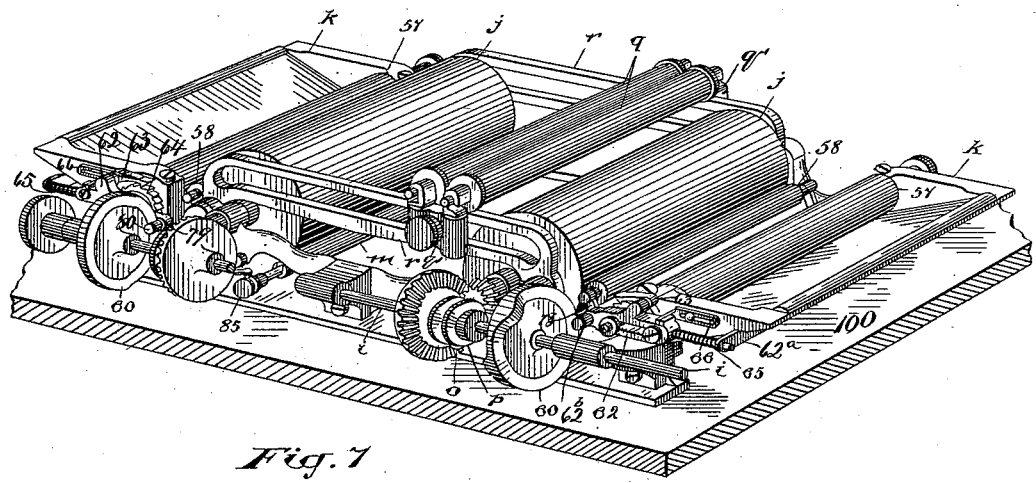
Figure 8:
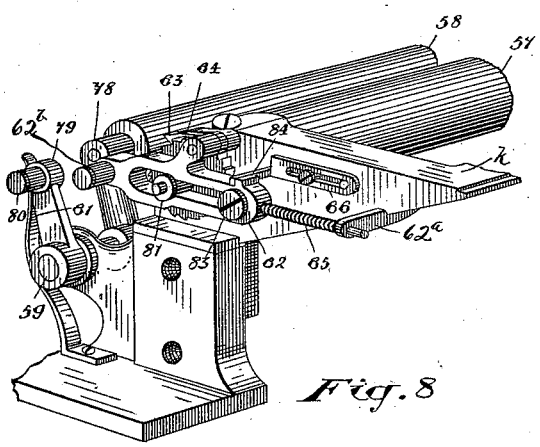
Figure 12:
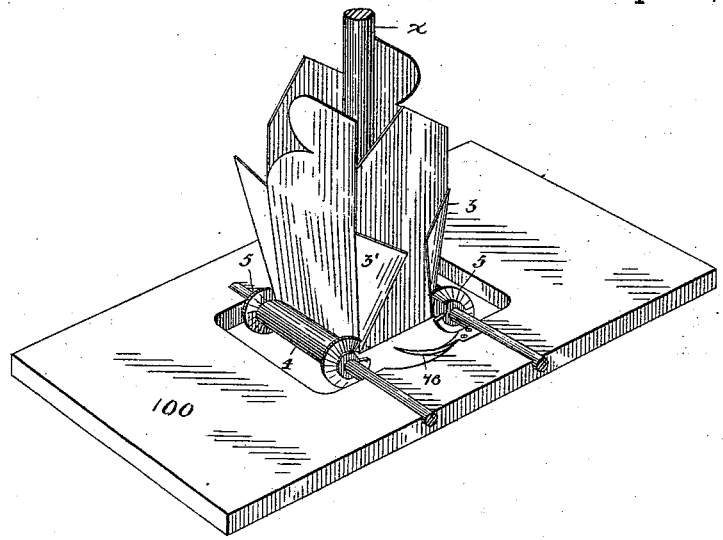
Figure 13:
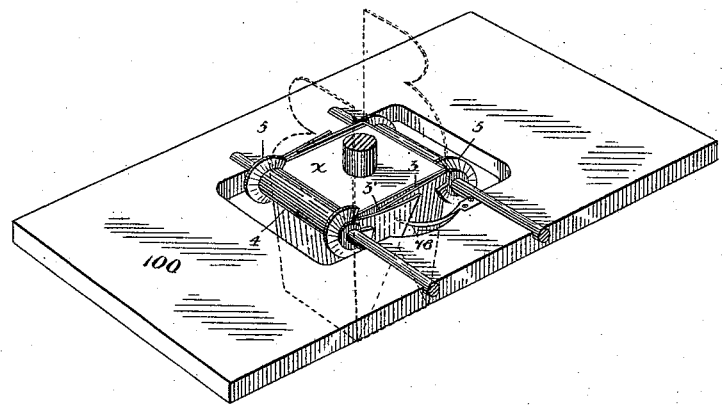
Figures 14, 15, 16, 17:
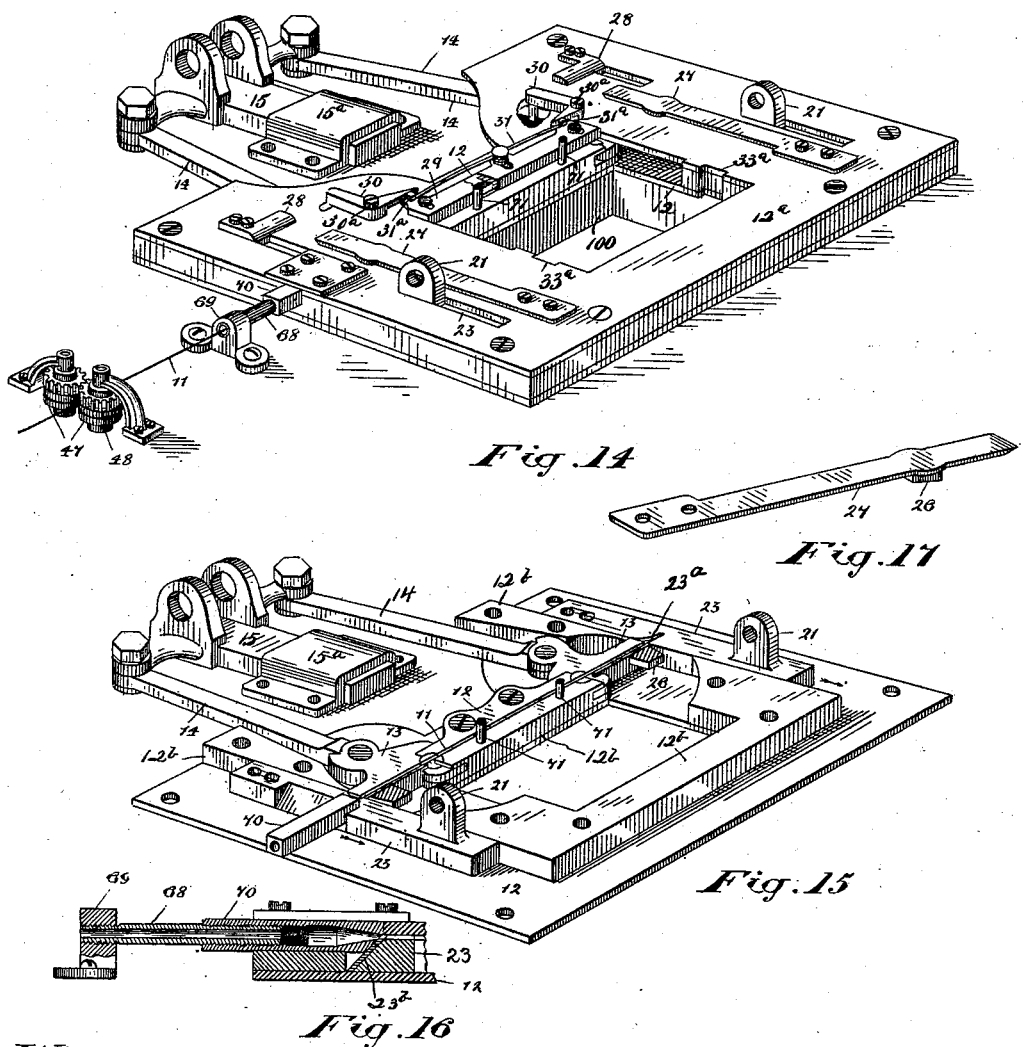
Figure 19:
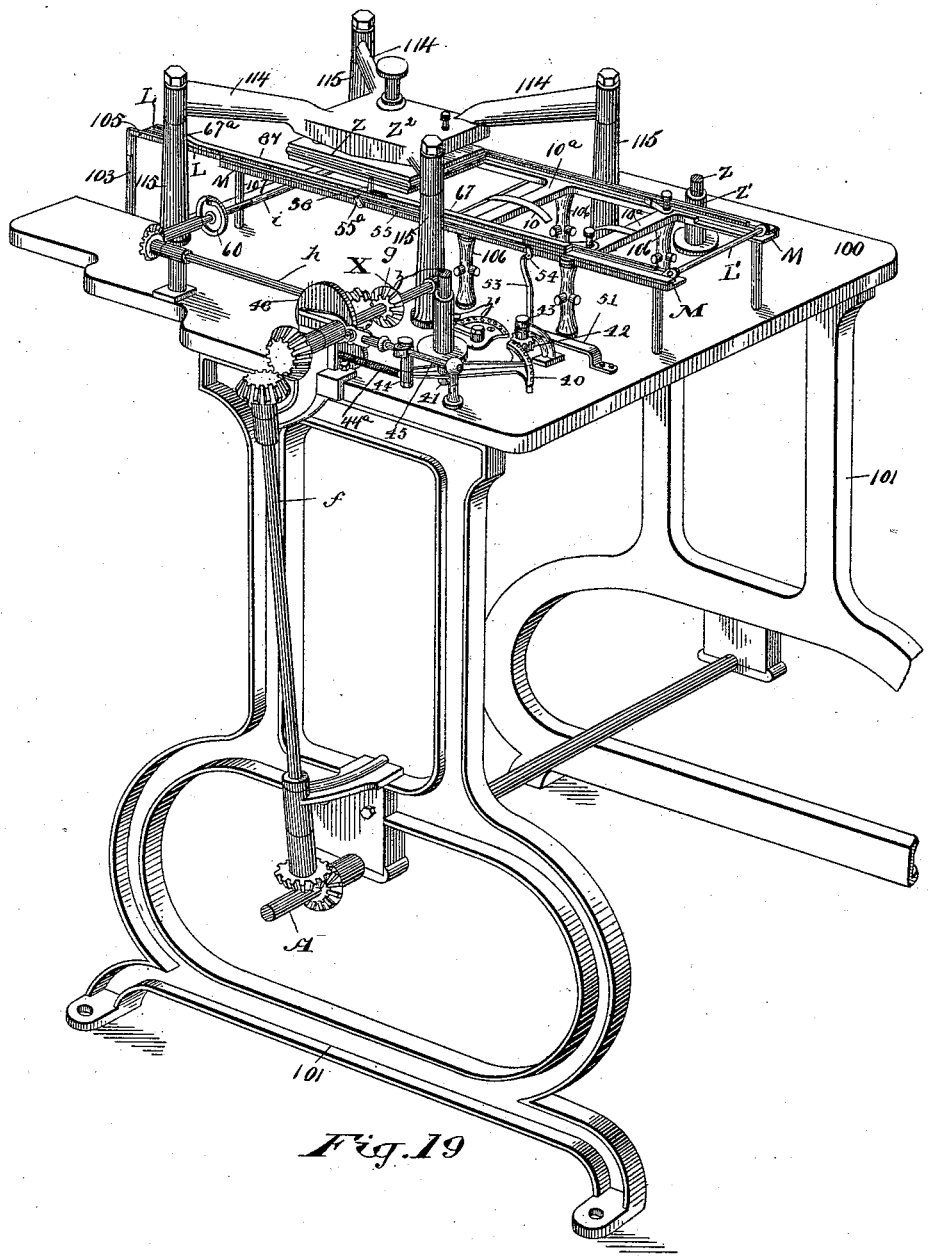
Figure 27:
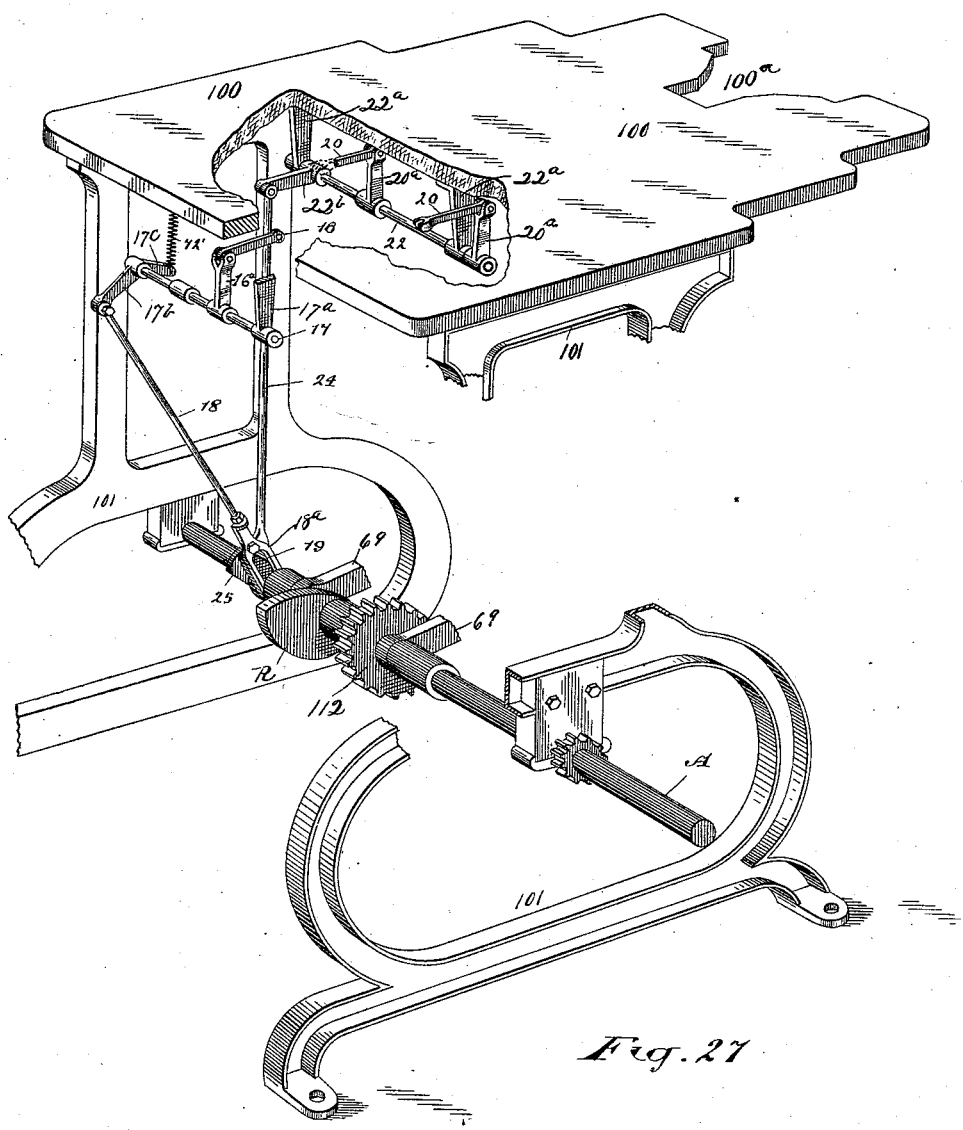
Figure 30:
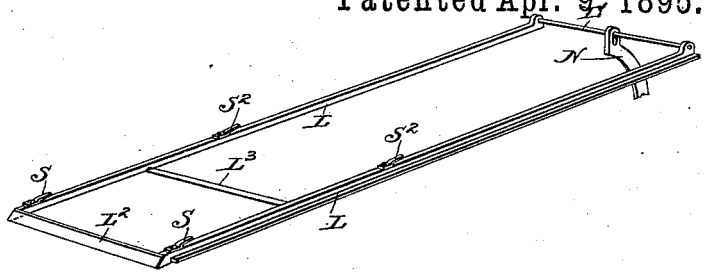
Figure 31:
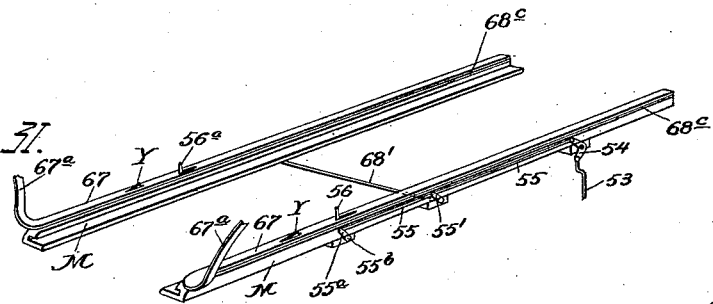
Figure 32:
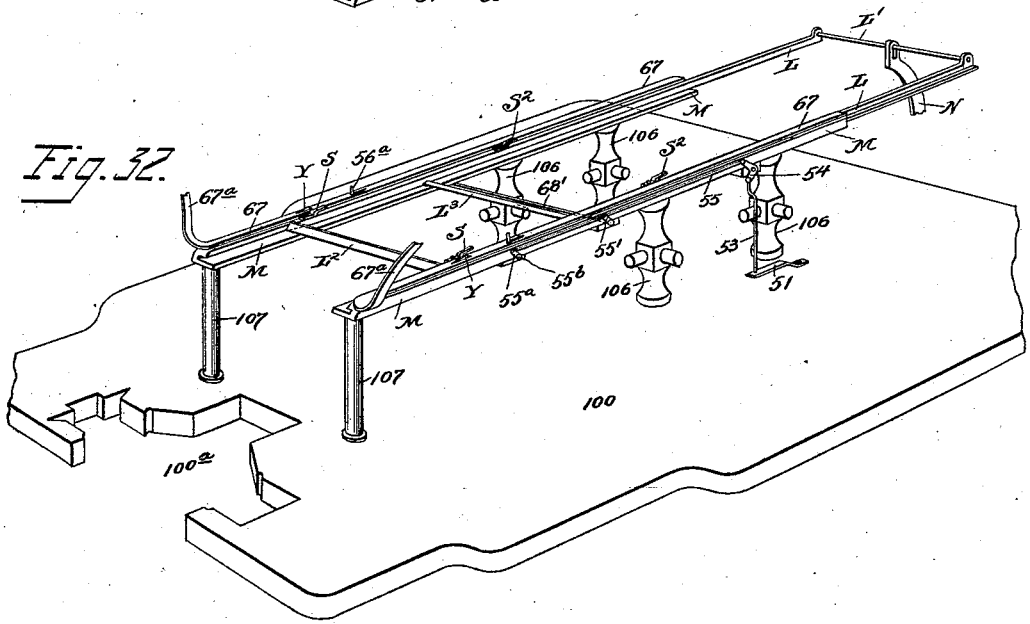
Figure 33:
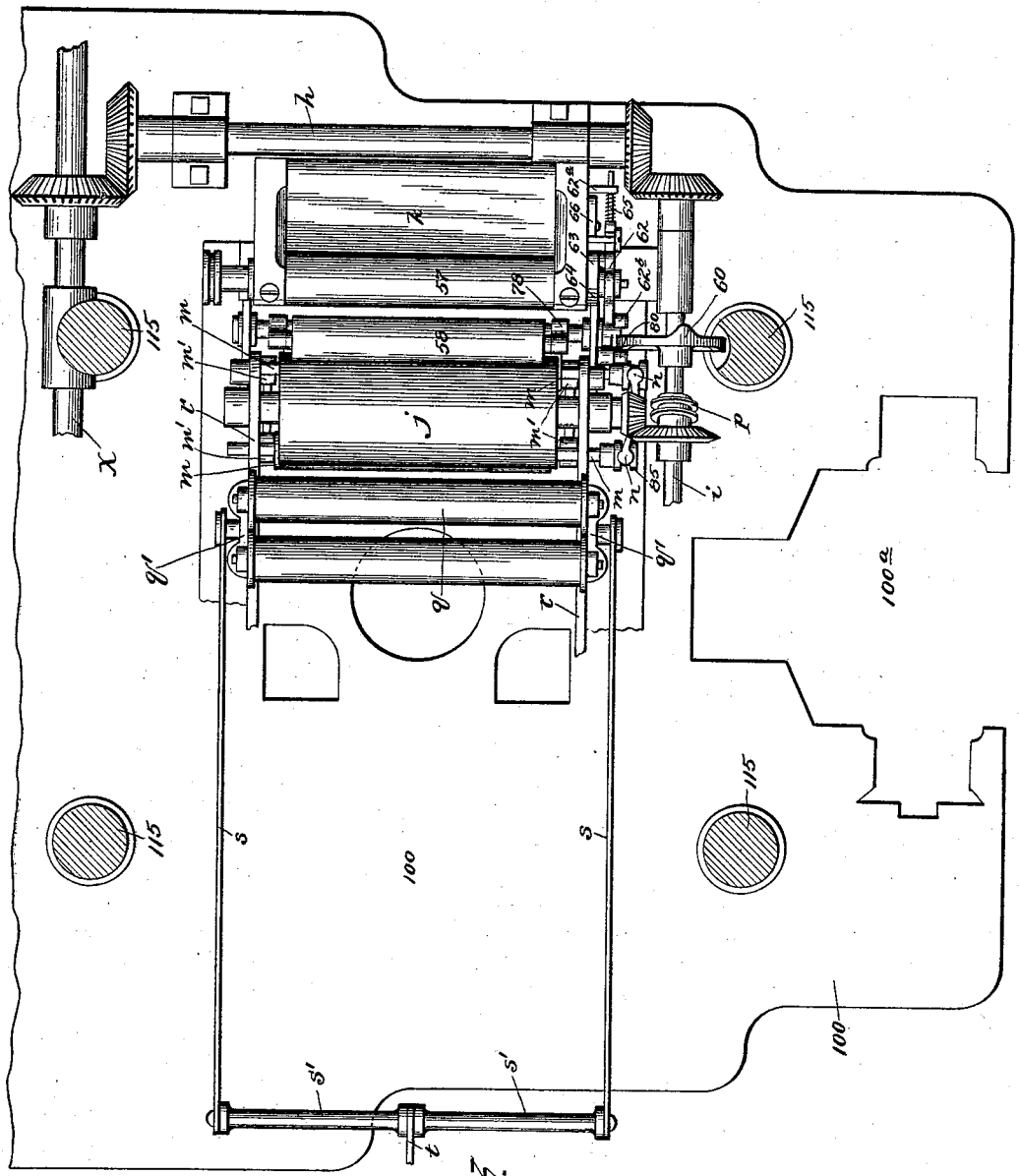

Figure 1 is a perspective view of the machine looking at its rear left hand corner, with a portion of the framework broken away and some of the parts omitted to more clearly show others; Fig. 2, a detail perspective view of some of the parts at the front end of the machine; Fig. 3, a detail side elevation of part of the feeding and printing devices; Fig. 4, a detail plan view of the pile of blanks and front end of the reciprocating carriage of the feeding mechanism, showing the parts in the position they occupy after the rear side of the upper blank has been lifted by the picker and the end of the carriage moved beneath it, the four vertical posts between which the pile of blanks is confined and guided being shown in section; Fig. 5, a detail perspective view of the vertically reciprocating type-bed, its guides and supporting and actuating rod, part of the bed being broken away to show its pivotal connection with the rod; Fig. 6, a detail view, partly in section, of the exhaust pump for the picker; Fig. 7, a perspective view of the inking rollers of the printing mechanism, and Figs. 8 and 9 details thereof; Fig. 10, a vertical section, and Fig. 11 a top plan view, of the folding mechanism; Figs. 12 and 13, perspective details showing the operation of the spiral bending or folding cams upon the side flaps or folds of the vessel; Fig. 14, an inverted perspective of the mechanism for forming the wire bail and attaching it to the vessel; Fig. 15, a corresponding view with the upper plate in Fig. 14 removed to expose the parts beneath; Fig. 16, a sectional detail of the guide tube through which the wire passes to the bailing mechanism; Fig. 17, a perspective detail of one of the spring plates which carry the lugs around which the ends of the bail are bent; Fig. 18, a bottom plan view of the bailing mechanism, showing the plunger in section; Fig. 19, a detail perspective view of the machine looking at its rear right hand corner, showing some of the parts for actuating and controlling the wire-feeding devices; Figs. 20 to 24, detail views of the wire-feeding devices; Fig. 25, a detail longitudinal view of the front portion of one of the guideways for the blank-carrier, showing one of the stop arms and one of the gravity stops, with the flap of the blank in dotted lines between them; Fig. 26, a detail perspective view of the parts about the upper portion of the folding mechanism; Fig. 27, a detail perspective view looking at the rear left hand corner of the machine, with part of the table and framework broken away and showing the actuating devices for the bailing mechanism; Fig. 28, a side elevation of the devices for delivering the completed vessels from the machine, and Fig. 29 a rear elevation of the same; Fig. 30, a perspective view of the blank-carrier; Fig. 31, a similar view of the guideways in which it travels; Fig. 32, a similar view showing the carrier in its extreme rearward position in the guideways, with the supports for the latter upon the table, and Fig. 33 a top plan view of one half of the inking mechanism for the types of the printing mechanism, and the front end of the table upon which it rests.

Inasmuch as the first step in the operation of the machine is to pick up the uppermost blank in the pile supplied to the machine and advance it to the printing point, the automatic feeding mechanism will be first described, and be followed in succession by descriptions of the other mechanisms in the order of their operation.

The main framework of the machine consists of a horizontal table 100 supported upon side frames 101, in bearings in the lower middle portions of which side frame is journaled the transverse driving shaft A. The shape of the table 100 is shown most clearly in Figs. 1, 27, 32 and 33, where it will be seen that it is provided near its rear end with a rectangular opening to accommodate the folding mechanism, while its front edge has in it a recess $100^a$ approximately of the shape of one half of an unfolded blank, in which recess fits the rear side of the pile of blanks resting upon a support beneath. This support consists of a vertically movable shelf or table G', Figs. 1 and 2, carried by and projecting to the right from a bracket 102 secured to a slide W' mounted in vertical guides in a frame O' depending from the table 100. This shelf G' is in the present instance of approximately the same shape as the blanks and the pile of the latter is held in true vertical position upon it by means of four vertical guide rods 103 carried by bracket plates 104 adjustably secured to the table 100 about the recess $100^a$. All four of the rods project above the top of the table to approximately the top of the pile of blanks upon the shelf G', (dotted lines Fig. 3.) The two rear rods extend downward below the table to approximately the lowest position occupied by the shelf G', while the two front rods depend only a short distance beneath the table. The two opposite side flaps of the blanks at the upper end of the pile are confined between the front and rear rods 103 at each side, as seen in Fig. 4. The two front rods have secured to their upper ends rearwardly projecting fingers 105 which overlie the side flaps of the blanks and prevent the uppermost blanks from becoming displaced from the pile.

By means hereinafter described the shelf G' is automatically raised as the blanks are removed one by one from the top of the pile, to maintain the latter in approximately the same horizontal plane at all times, in position for the uppermost blank to be picked up and carried to the printing and folding mechanisms by the devices to be now described.

Extending from front to rear of the machine are two parallel longitudinal guideways M M separated from each other about the distance of the width of the body of one of the paper blanks and supported at their front ends on posts 107, and near their rear ends on posts 106, upon the table 100. Fitting in the grooved guides in these ways M M are the side bars of the reciprocating blank-carrier L, Fig. 30, which consists of said bars, a transverse rod L' connecting their rear ends, a cross bar $L^2$ connecting their front ends, and a second cross bar $L^3$ connecting them a short distance in rear of their front ends, Figs. 30 and 32. The cross rod L' at the rear end of the carrier passes through a slot in the upper end of a forked arm N, Fig. 1, (one fork being broken away in the drawings,) which arm is fastened at its lower end to a rockshaft O journaled at its opposite ends in bearings upon the side frames 101. Fast upon this shaft is a pendent arm P to whose lower end is connected the rear end of a rod Q which rod has secured to its front end a forked or slotted plate $Q^2$ which embraces the driving shaft A and serves to support and guide the front end of the rod. The plate $Q^2$ carries an anti-friction roller $Q^3$ which is acted upon by a cam R fast upon the driving shaft A, to reciprocate the rod Q and thereby rock the shaft O and reciprocate the blank-carrier L. The front end of the plate $Q^2$, which embraces the shaft A, is hidden by the cam R in Fig. 1, but the construction above described will be readily understood without further illustration.

The point of connection between the rear end of the rod Q and lower end of the arm P is adjustable, so that it may be raised or lowered to give greater or less throw to the arm and consequently greater or less movement to the carrier L. A spring $Q^4$ connected at its rear end to the arm P and at its front end to a fixed point pulls the rod Q forward and holds the roller $Q^3$ against the cam R, serving to return the carrier L to its rearward position after it has been moved forward by the action of the cam.

As the carrier is moved to its extreme forward position the rear edge of the uppermost blank in the pile is lifted, by means to be now described, and the front end of the carrier passes under it, as seen in Fig. 3, and when the blank is released it drops back upon the carrier ready to be carried by the latter to the printing and folding mechanisms. The means for thus lifting the blank to permit the carrier to pass under it we term the picker. It consists, in brief, of a vibrating arm having a passage in it communicating at one end with an exhaust pump operated by the machine and opening at its other end through the end of the arm which contacts with the blanks. The pump is so operated that when the open end of the arm is thrown against the blanks the air will be exhausted from the passage, causing the top blank to adhere to the arm and be lifted by it as the arm moves upward, and after the end of the carrier has moved beneath the blank air is admitted to the passage again and the blank released and permitted to drop upon the carrier. Under the particular construction shown in the drawings this vibrating picker arm consists of a straight piece of pipe G screwed at one end into a T fitting interposed in a vibrating crank shaft B journaled at its opposite ends in brackets 108 upon the front edge of the table 100. The rear end of the pipe G has screwed upon it an elbow-fitting projecting downward toward the top of the pile of blanks, but instead of permitting the lower open end of this elbow to contact with and pick up the blanks, as might be done, we have in the present instance secured to it a head piece or block H having a flat under side adapted to fit against the top of the pile of blanks, and this block H has projecting rearwardly from it a downwardly curved open-ended hollow finger $G^2$ which communicates at its front end, through a passage in the block H, with the interior of the pipe G. The crank shaft B is hollow, at least that portion of it to the left of the T-fitting which carries the picker arm, and in the form illustrated in the drawings it is made up of two straight end sections which form its journals in the brackets 108, two goose-neck fittings screwed upon the inner ends of these straight end sections, two short straight sections screwed into the inner ends of said fittings, and the T-fitting connecting these last named sections. The entire shaft may be composed of sections of pipe and the fittings, in which event the passage at the right of the T fitting will be suitably closed at some point, so that the air may be exhausted from the picker arm by suction applied at the opposite end of the shaft B. At its right hand end the shaft B has fast upon it an arm C, Fig. 2, to which is connected the upper end of a rod D whose lower end carries a slotted plate embracing the shaft A' and carrying a roller co-operating with a cam E fast upon said shaft. A spring F connected at its upper end to the table 100 and at its lower end to the rod D pulls the latter upward and serves to rock the shaft B and throw the rear end of the picker arm downward against the top of the pile of blanks when the position of the cam E permits. Connected to the left hand end of the shaft B is a flexible tube 109 whose opposite end is connected to the exhaust pump I, shown in detail in Fig. 6. The piston rod K of this pump is operated by a cam J fast upon the rotary shaft A' driven from the shaft A, Fig. 1, said cam co-operating with a stud or roller upon a plate secured to or formed upon the lower end of the rod and slotted to embrace and be guided upon the shaft A'. A coiled spring J' surrounding the rod K within a tube screwed into the lower head of the pump cylinder bears at its lower end against an adjustable sleeve K' screwed upon the rod K and presses the rod downward and returns it and the piston to their lower position after they have been raised by the cam J. The adjustment of the parts is such that the cam will raise the piston rod while the picker arm G is being moved downward toward the pile of blanks, and after the head H and open end of the finger $G^2$ contact with the top blank, and while they are resting thereon, the rod will be released by the cam and the spring J' will quickly move the piston downward in the pump cylinder and exhaust the air from the picker arm, so that when the latter is moved upward the blank will be lifted by it as in Fig. 3. It will be held in this lifted position until the cam J lifts the piston again and thereby admits air to the picker arm, and this it does just after the carrier has moved beneath the blank ready to receive the latter when it is released and drops from the picker arm.

The two guideways M M are substantially in line with the guide rods 103 on each side of the pile of blanks, Fig. 4, so that the side bars L of the carrier are also approximately in line with said rods. The result is that when the carrier is moved forward under the lifted blank its two side bars will pass beneath the two side flaps of the blank just at their junction with the body of the blank. Each of said side bars has adjustably secured upon its upper side near its front end a rearwardly projecting hook S. These two hooks ride under the side flaps of the blank as the carrier reaches its forward limit of movement and lifts them, and as the hooks clear the forward edges of the flaps the latter fall in front of them, so that at the beginning of the return rearward movement of the carrier the hooks catch over the edges of the flaps and carry the blank along with the carrier.

For the purpose of preventing the picker arm lifting more than one blank at a time there are provided the two separating fingers 88, Figs. 3 and 4, secured to a fixed support at their lower ends and having their upper ends bent forward over the extreme rear edge of the top of the pile of blanks. If two or more of the uppermost blanks adhere to each other, so that the lifting of the top one tends to lift the others with it, the engagement of the rear edges of the blanks with the hooked ends of the fingers 88 will separate the lower blanks from the upper and permit the passage of the latter only.

As an additional means for separating the blanks there are shown in Fig. 4 two other spring arms or plates 88ª, secured to the under sides of the front ends of the guides M—M and projecting at their front ends over the rear edges of the bodies of the blanks, and adapted to permit the uppermost blank to readily slip from under them but to separate from it any blank or blanks beneath it which might adhere to and otherwise be lifted by it.

The means heretofore referred to for automatically raising the shelf G' which carries the pile of blanks, to maintain the top of the pile in position for the picker arm to lift the blanks, may be next described, reference being had more particularly to Figs. 1 and 2. Fast upon the left hand end of the crank-shaft B is a pendent arm P' having at its lower end a rearwardly curved finger Q' which passes through a slot in the upper end of a bar M' vertically guided by slots and screws upon the front edge of the guide frame O' in which travels the slide W' which carries the shelf G'. Mounted in the upper end of the bar M', between the two ears formed by the slot through which the finger Q' passes, is a roller which rests upon the finger and supports the bar, the latter being thereby hung, as it were, upon said finger, but guided in its vertical movements by its connection with the frame O'. The shape of the finger Q' is such that when the lower end of the arm P' is in its rearmost position the bar M' will be held in its highest position, and as the arm is swung forward by the rocking of the shaft B the bar M' will be lowered a greater or less distance according to the extent of movement of the arm P' and shaft B. Inasmuch as the rearward movement of the shaft B and downward movement of the picker arm are not positive, but are produced by the spring F connected to the rod D which co-operates with the cam E, it follows that such movements will be greater or less according to the height of the pile of blanks and the distance the end of the picker arm consequently has to move before it comes in contact with and is arrested by the top of the pile. As the top of the pile is gradually lowered by the removal of blanks from it the vibration of the picker arm, shaft B and arm P' will be gradually increased, and likewise the vertically reciprocating movement of the bar M'. The latter carries a hooked pawl S' which co-operates with a ratchet T' fast upon a shaft V' journaled in bearings upon the frame O', Fig. 1, and having fast upon it a pinion R² meshing with a rack R³ fast upon the left hand side of the slide W' which carries the shelf G'. A holding pawl U' pivoted to a lug upon the frame O' and spring-pressed against the ratchet prevents backward movement of the latter and downward movement of the slide W' and shelf G'. It results from this construction that the bar M' will be lowered and raised at each revolution of the driving shaft and vibration of the picker arm, and that whenever the pile of blanks gets so low that the vibration of the picker arm is sufficient to lower the bar M' far enough for the pawl S' to engage a fresh tooth of the ratchet T' the return upward movement of the bar will turn the ratchet the space of one tooth and lift the shelf G' and pile of blanks resting upon it. Between such intermittent movements of the ratchets the pawl S' will play idly back and forth upon the back of the tooth on which it is resting. In this manner the automatic lifting of the pile of blanks is controlled by the position of the top of the pile, so that the latter is maintained in position for the picker arm to operate until all the blanks in the pile are used.

The shaft V' is provided with a hand wheel V² by which it may be turned to quickly lift the shelf G', as where a fresh supply of blanks has just been placed upon it and it has to be lifted to bring the top of the pile in position for the picker arm to reach them. To lower the shelf, after the blanks have all been used, the pawls S' U' are disengaged from the ratchet and the hand wheel turned in the reverse direction. For the purpose of readily disengaging both pawls from the ratchet and holding them out of engagement while the shelf is being lowered there is provided a curved lever Y' pivoted to a lug projecting from the frame O' and engaging at one end with the tail of the pawl S' and at its other with the nose of the pawl U'. By pressing this lever to the right both pawls may be disengaged from the ratchet.

The purpose of providing the end of the picker arm with the head H and rearwardly projecting finger G², instead of permitting the lower end of the elbow upon the rear end of the arm to contact directly with the blanks, or providing the arm with an integral downwardly curved end for the same purpose, is as follows: If the open end of the elbow or arm, (or the open rear end of the finger G²,) were the only point of contact between the picker arm and the top of the pile of blanks the pressure upon the top blank at such point would tend to exclude the air from between the blanks immediately below such point and thereby render the blanks beneath the top one more apt to adhere to the latter when it was raised; but by providing the head H, which contacts with and presses upon the top blank some distance in front of its rear edge, the rear edge of the top blank has a tendency to spring upward, so that it may be the more readily lifted from the blank beneath it by the finger G². This, however, is only a detail of construction, in no way essential to the general construction and mode of operation of the picker and other parts of the automatic feeding mechanism.

The rotary shaft A' which carries the cam J for actuating the pump I, heretofore described, Fig. 1, is journaled in bearings 110 carried by supports 111 depending from the under side of the table 100 and rigidly connected by an arch frame 86. The shaft A' is geared to the shaft A by means of three gears 112, one fast upon the shaft A', another upon the shaft A, and an intermediate one mounted on a shaft 113 secured at its opposite ends in bars 69 mounted at their rear ends on the shaft A and fastened at their front ends to the inner sides of the bearings 110 of the shaft A'.

In case it is not desired to print the blanks in the machine the latter need not be provided with any printing mechanism, and the reciprocating blank-carrier may deliver the blanks directly to the folding mechanism. In the machine illustrated in the drawings, however, the several features of our invention, as heretofore stated, are embodied in a machine in which the blanks are printed on their way to the folding mechanism, and the printing mechanism provided for this purpose may be next described. This printing mechanism consists of a fixed platen, a vertically reciprocating type-bed upon which the types rest and by which they are lifted against the platen to effect the printing, and inking mechanism for the types. The platen, Z, is carried by a fixed plate $Z^2$ having four integral arms 114 projecting from its corners and supported at their outer ends upon vertical posts 115 on the table 100. The type-bed, $a$, Figs. 2 and 5, is rectangular in shape and provided at its four corners with depending legs $a'$ passing through holes in the table 100 and guided by angle plates $a^2$ projecting upward from the table and embracing them. Pivoted between ears $a^3$ upon the under side of the type-bed, at its center, is the upper end of a rod $b$ extending downward through the table 100 and through a guideway in the arch 86, Fig. 1, and carrying at its lower end a roller $e$ resting upon a cam $d$ fast upon the shaft A'. This cam lifts the rod $b$ and type-bed at each operation of the machine just after the blank has been brought over the bed by the carrier, and forces the blank against the platen and effects the printing. Springs $c$ connected at their upper ends to a sleeve $b'$ secured upon the rod $b$, Fig. 5, and at their lower ends to the arch plate 86, pull the rod $b$ downward and hold the roller $e$ against the cam $d$. The types upon the bed $a$ are inked by a pair of rollers $q$ mounted at their opposite ends in bearings in slides $q'$ mounted to reciprocate transversely of the machine on ways $r$ located at the front and rear sides of the bed $a$ and between which the latter moves upward into contact with the platen, Figs. 7 and 33. The slides $q'$ are connected by rods $s$ to a cross rod $s'$ at the left side of the machine, Fig. 1, which cross rod is connected at its middle to the upper end of an arm $t$ fast at its lower end upon the front end of a rock-shaft $t'$ mounted in a bearing $t^2$ supported upon the framework. Fast upon the rear end of the shaft $t'$ is a bell-crank $u$ whose depending vertical arm carries a roller $u'$ pressed by a spring $u^2$ connected to the upper arm of the bell-crank against a cam $v$ mounted upon a stub shaft $v'$ and geared to the main driving shaft A. The gearing is such that the cam $v$ will be given a half revolution for each complete revolution of the shaft A, so that the inking rollers $q$ will be moved across the types in one direction at one revolution of the shaft A and in the reverse direction at its succeeding revolution.

The rollers $q$ take ink from two large rollers $j\,j$ journaled in bearings upon the upper side of the table 100, one at the right and the other at the left side of the type-bed $a$ and between which said bed has its vertical movement. There is an ink fount or trough $k$ for each of the rollers $j$, the ink being carried from the founts to the rollers by means of intermediate rollers 57, 58. The rollers 57 are journaled in the lower inner ends of the founts $k$, while the rollers 58 are mounted to swing back and forth between the rollers 57 and the rollers $j$ and carry ink from the former to the latter. Each roller 58 is mounted at its opposite ends in arms 78 fast upon a rock shaft 59, Figs. 7 and 8. This shaft has fast upon its outer end an arm 79 against which bears a spring 61 which tends to hold the roller 58 in contact with the roller 57. The crank-arm 79 carries a roller 80 which bears against one side of a cam disk 60, Figs. 7 and 33, fast upon a rotary shaft $i$ geared at one end to a shaft $h$, Fig. 33, which latter shaft is geared to a rotary shaft X hereinafter described. As the shaft $i$ revolves the cam permits the spring 61 to throw the roller 58 against the roller 57, to take ink from the latter, and then throws it against the roller $j$, to ink the latter. Each roller 57 has fast upon one end a ratchet 64 with which co-operates a hooked pawl 63 pivoted to a slide 62 guided upon the projecting end 81 of the spindle of the roller and a stud 83 on the side of the ink fount $k$. The slide 62 has a rod projecting from one of its ends and passing through a plate $62^a$ projecting from the ink fount $k$, and a spring 65 coiled around the rod and confined between the plate and the end of the slide presses the latter in one direction, to the left in Fig. 8. A roller $62^b$ carried by the opposite end of the slide bears against the side of the cam disk 60 opposite the roller 80 on the crank arm 79 before described. The cam moves the slide in one direction and the spring moves it in the other and causes the pawl 63 to turn the roller 57 in the ink fount $k$. An adjustable stop 66 upon the side of the fount $k$ co-operating with a lug 84 on the slide 62 limits the movement of the latter under the influence of the spring 65, by adjusting which stop the pawl 63 may be permitted to slip backward over a greater or less number of teeth on the ratchet 64 and the roller 57 consequently be turned forward a greater or less distance. The adjustment of the parts is such that the roller 58 is thrown into contact with the roller 57 while the latter is turning.

Figure 9:
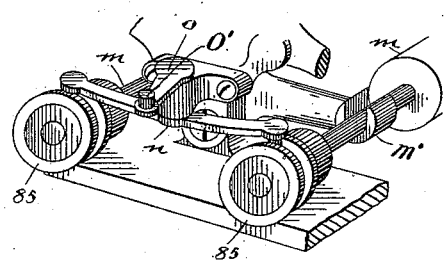

The two distributing rollers $m\,m$ for each of the large rollers $j$ bear against the under side of the latter and their spindles are mounted in bearings $m'$ which permit longitudinal movements of the rollers, Fig. 9. The two rollers of each pair are connected by a lever $n$ pivoted on a vertical pivot at its middle and provided at its opposite ends with pins fitting in circumferential grooves in cylindrical blocks 85 fast upon the spindles of the rollers. The upper end of the pivot of the lever $n$ has fastened to it an arm $o$ provided with a stud $o'$ fitting in a circumferential cam groove in a block $p$ fast upon the shaft $i$, Fig. 7, by which the rotation of said shaft is caused to reciprocate the rollers $m\ m$ longitudinally in opposite directions to evenly distribute the ink upon the roller $j$.

As the blank is carried forward to the printing point by the carrier its side flaps, which are engaged by the hooks S, rest and travel upon the guideways M M and project beyond the same at either side. For the purpose of holding the blanks in position upon the carrier there is arranged above each guideway, slightly separated from it to leave a narrow passageway for the flap of the blank, a guide bar 67. At their front ends these bars are supported by curved arms 67$^a$ secured to the posts 115, Fig. 2, while at their rear ends they are secured to the guideways M M, thin blocks or plates 68$^c$ being interposed between them and the guideways to properly separate them, Figs. 1 and 19. If desired the rear ends of the bars 67 may be supported by arms projecting from the rear posts 115, in the same manner their front ends are supported by the arms 67$^a$, in which event their rear ends may terminate just in rear of said posts and not be connected to the ways M M. The side flaps of the blank enter the narrow passages between the bars 67 67 and ways M M as soon as the carrier begins its rearward movement and are confined in them during their entire rearward travel to the folding mechanism.

For the purpose of arresting the blank at the printing point and preventing it moving too far there are provided two stop arms T, Figs. 1, 3 and 25, whose downwardly bent front ends are thrown into the path of the blank before it reaches the printing point and arrests it at the proper place, and are lifted out of the path of the blank after the printing has been done, to permit the blank to be moved on to the folding mechanism. These arms T are secured at their rear ends to a rock shaft U journaled at its opposite ends in bearings upon the front sides of the two rear posts 115, Figs. 1 and 3. This shaft has secured upon its extreme left hand end a depending arm V which carries at its lower end a roller bearing against a cam W fast upon the rotary shaft X geared to the driving shaft A in the manner hereinafter described. This cam is so shaped and its movements so timed that it will cause the shaft U to be rocked and the arms T vibrated in the manner and for the purpose above described.

As soon as the carrier L has moved a blank to the printing point and brought its rear edge in contact with the stop arms T it returns to the front of the machine for the next blank. To prevent the carrier taking the blank with it in such return movement, and to positively disengage the flaps of the blanks from the hooks S S of the carrier and hold it in exact position while the printing is being done, there are provided two gravity stops or catches Y Y, one pivoted in a slot in each guide bar 67 just forward of the printing point, Fig. 25. These stops consist of thin plates having narrow front and widened rear ends. They are pivoted at their front ends upon horizontal pivots in the front ends of the slots in the bars 67 and their rear ends rest upon the upper surfaces of the guideways M M beneath the bars 67. When the side flaps of the blank, traveling in the narrow passages between the bars 67 and guideways M M, reach the catches Y Y they ride under and lift them, and as soon as the flaps clear the catches the latter drop in front of them and confine them between the rear ends of the catches and the stop arms T T, as indicated by the dotted lines of the blank in Fig. 25.

For the purpose of directing the blanks beneath the platen Z as they are moved toward it by the carrier, and preventing any whose rearward flaps might be bent upward from contacting with the platen, the latter has secured to its front side an upwardly curved guide wire 89 with which any such upwardly projecting flaps come in contact and are directed by it beneath the platen.

After a blank has been printed the next step is to carry it to the folding mechanism. For this purpose the side bars of the carrier L are provided with a second set of hooks, S$^2$, similar to the hooks S, Figs. 3 and 25. The hooks S$^2$ are located upon the side bars of the carrier at such distance in rear of the hooks S that when the carrier is in its extreme forward position, Fig. 3, the hooks S$^2$ occupy approximately the same position which the hooks S occupy when the carrier is moved to its extreme rearward position to carry the blank to the printing point. When, therefore, the carrier moves to the front of the machine again, for the next blank, the hooks S$^2$ will ride under the side flaps of the blank lying between the catches Y Y and stop arms T T and pass to the front of the same, and when the carrier moves rearward again, to bring the next blank to the printing point, the hooks S$^2$ will catch over the blank under which they have just passed, and, the arms T T being lifted out of its path by the cam W, carry it rearward to the folding mechanism simultaneously with the movement of the new blank to the printing point. It will thus be seen that the carrier moves two blanks at the same time, its hooks S$^2$ moving the printed blank from the printing to the folding mechanism, and its hooks S simultaneously moving the succeeding blank to the printing point.

In case it is not desired to print the blanks the printing devices, (excepting the fixed platen and its supports,) may be readily removed from the machine and the feeding devices will continue to automatically carry the blanks to the folding mechanism in the same manner as if the printing mechanism were present, the carrier at each operation moving a blank from the pile to a point between the catches Y Y and stops T T and simultaneously moving the preceding blank from such point to the folding mechanism, thus supplying a blank to the latter mechanism at each operation.

The mechanism for folding the blank into vessel shape, preparatory to applying the wire bail to it, may be of any suitable construction adapted for the purpose. That which we have illustrated and will now briefly describe is similar to that shown and described in Patent No. 440,570, heretofore granted to James W. Hutt. The table 100 is provided in rear of the printing mechanism, between the guideways M M, with a rectangular opening about which are arranged the four posts 106 which support the rear ends of the guideways, one post being adjacent each corner of the opening. Journaled in bearings in these posts are four rotary folding cams $w$ geared together as seen in Fig. 11 so that the rotation of one will rotate all of them in unison. The spindle of the forward one of these cams consists of the left hand end of the rotary shaft X heretofore referred to, said shaft extending through the bearings in the two forward posts 106 and having the cam fast upon it, Figs. 1 and 11. This shaft is geared to the driving shaft A by means of the vertical shaft $f$ and beveled pinions shown in Fig. 19, and has bearings upon the rear sides of the posts 115 as well as in the posts 106. Arranged to reciprocate vertically through the center of the opening between the folding cams is a plunger $x$, Figs. 10, 12 and 13, carried by a cross-head $g$ extending transversely of the machine and supported at its opposite ends by rods $z$ $z$ extending downward through tubular guideways $z'$ $z'$ upon the table 100 and carrying at their lower ends slotted plates $z^2$ embracing the driving shaft A, Fig. 1. Fast upon said shaft just within each side frame 101 is a cam 2, (only the right hand one being shown in Fig. 1,) upon which rest rollers $z^3$ carried by the plates $z^2$. The cross-head and plunger are moved downward by strong springs (not shown) connected to the rods $z$ $z$, and are moved upward by the cams 2. The shape of the cams $w$ is such and their movement so timed that as the plunger $x$ descends between them they will bear snugly against its four sides from its lower to its upper end. Arranged about the opening through which the plunger descends and curved inwardly and downwardly toward the center of the opening are a series of plates 10. The two shown in Figs. 1 and 19 are secured to cross bars $10^a$ connecting the two guideways M M in front and rear of the opening, while the two side ones shown in Figs. 10 and 26 are secured to the guideways M M. The lower inner ends of these plates form a rectangular opening slightly larger than the upper end of the plunger and through which the plunger passes when it descends. These plates serve to support the blank in proper position beneath the plunger and aid in folding it into shape as the plunger descends to carry it between the folding cams $w$. The adjustment of the parts is such that the carrier L reaches its extreme rearward limit of movement just before the plunger descends, and has a blank in position beneath the plunger ready for the latter to carry it downward between the plates 10 and cams $w$ and thereby fold it to the shape shown in Fig. 12. The next step is to bend the corner folds thus formed over upon each other on opposite sides of the plunger. To that end there are provided the two rollers 4 4, one at the front and the other at the rear of the plunger, and each provided with two spiral cams 5 5 adapted in the rotation of the rollers to press the corner folds inward against the sides of the vessel as the plunger descends between them. The pitch of these cams corresponds to the inclination of the sides of the plunger, so that while the upper ends of the cams in Fig. 12 will engage the flaps or folds as soon as the lower end of the plunger passes between them the cams as they turn will accommodate the outward inclination of the sides of the plunger as the latter descends and continue to bear against the flaps and press them tightly against the sides of the vessel until the enlarged upper end of the plunger passes between and clears them, as seen in Fig. 13. For the purpose of holding one of the corner flaps at each side out of the path of the other flap as they are folded against the sides of the vessel, and to thereby cause the one to properly overlap the other, there is provided a curved finger 76 at each side of the plunger, secured at one end to the table 100 and curved inward at its other toward the side of the plunger. These fingers serve to hold the rear flaps 3' in check while the forward flaps 3 are being bent against the sides of the vessel by the two forward cams, and then permit the rear flaps to be bent into position over them.

The cams 5 are oscillated back and forth through approximately a complete revolution at each operation of the machine by means of a vertically reciprocating plate 6, Figs. 1 and 25, provided on its front and rear edges with racks meshing with pinions 7 7 fast upon the left hand ends of the spindles of the rollers 4 4 which carry the cams. This plate is suitably guided in the framework and has secured to its lower end a rod 8 extending downward to a point adjacent the driving shaft A, where it has secured to it a slotted plate which embraces the shaft and carries a roller co-operating with a cam 9 fast upon the shaft. By this means the rotation of the shaft reciprocates the rack plate 6 and oscillates the cams 5. A suitable spring, not shown, pulls the plate 6 and rod 8 downward and holds the roller against the cam.

After the blank has been folded into vessel shape, as seen in Fig. 13, the next step is to attach the wire bail to it, and the bailing mechanism for forming such bail and applying it to the folded vessel may be next described. This mechanism is mainly inclosed in a casing secured to the under side of the table 100, Fig. 10, and composed of a top plate 12, a bottom plate 12$^a$, and suitable intermediate plates to form a closed casing at the front and sides but not at the rear. This casing has a rectangular opening through it co-incident with the opening in the table, through which the plunger carries the folded vessel and remains at rest while the bail is being attached to it. In Figs. 14 to 18 this casing and the various parts of the bailing mechanism are shown in inverted position to facilitate an explanation of them, Fig. 18 being a bottom plan view and Figs. 14 and 15 inverted perspectives. The wire 11 from which the bails are formed is carried upon a suitable supply reel, (not shown,) from which it is drawn and delivered to the bailing mechanism by a pair of feed rollers or disks 47 48, which, with their associated devices, will be hereinafter more fully described. The wire enters the bailing mechanism through a round tube 68 screwed at its outer end in a lug 69 upon the under side of the table 100 and at its inner end in the outer end of a square tube 70 extending through the side of the casing. From the inner end of the square tube the wire passes across the casing to the opposite side thereof, being guided by and lying in a groove in a thick plate or block 12$^b$ secured to or formed integral with the plate 12 of the casing and partly surrounding the rectangular opening therein. This block is cut away or rounded out at the opposite ends of the opening to accommodate the movement of a pair of bending and driving wings 13 13, Fig. 15, hinged to the block at the rear corners of the opening. The groove in which the wire 11 lies extends through these wings near their front edges, Fig. 15. Mounted to slide back and forth within the casing at the opposite sides of the block 12$^b$ are two slides 23 23 having ears 21 projecting through slots in the bottom plate 12$^a$ of the casing. The inner end of the tube 70 abuts against the beveled outer side of the left hand slide in Fig. 15 and the slide has secured to it a hardened steel cutter 23$^b$, Fig. 16, which co-operates with the end of the tube to shear off the wire. The passage in the tube 70 is tapered to the cutting point, and the tube is capable of slight longitudinal movement to permit it to be properly adjusted in relation to the cutter on the slide. Such adjustment may be effected by turning the tube 68, which has a thread of coarser pitch in the lug 69 than in the tube 70. The opposite end of the wire rests in a recess 23$^a$ in the opposite slide 23.

Secured at their front ends to the plate 12$^a$ of the casing, near its front edge, Fig. 14, are a pair of spring arms 27 carrying lugs 26 which extend through openings in the plate and fit in the corners formed by the outer ends of the wings 13 13 and inner faces of the slides 23 23 adjacent the opposite ends of the wire. When the slides are drawn forward the ends of the wire, which project beyond these lugs, will be bent at right angles against the outer sides of the lugs. This will form the short bent ends of the bail which are to be driven through the sides of the vessel upon the plunger and clinched against the surface of the latter. To prevent the slides shearing off the ends of the wire against the lugs 26 the recess 23$^a$ in which one end of the wire fits has a curved rear side, Fig. 15, while similar provision is made in the other slide for the opposite end of the wire. After the slides have moved forward far enough to bend the ends of the wire around the lugs 26 a pair of wedges 28 carried by the rear ends of the slides ride under the beveled rear ends of the spring arms 27, Fig. 18, and lift the lugs 26 26 out of the path of the wire. At this point the wings 13 13, by means hereinafter described, are swung around against the sides of the plunger, as shown by the dotted lines in Fig. 18, carrying the wire with them and bending it into bail shape and driving its opposite ends through the sides of the vessel upon the plunger by which they are bent down and clinched upon the inner surface of the vessel as shown.

The means for actuating the wings 13 13 consists of a slide 15 confined in a guide 15$^a$ upon the plate 12 and having its laterally projecting arms connected by links 14 14 with the respective wings. Between ears upon the rear end of the slide is pivoted the front end of a link 16, Figs. 1, 10 and 27, whose rear end is pivoted to the upper end of an arm 16$^a$ fast upon a rock shaft 17. This shaft is journaled in bearings 17$^a$ depending from the under side of the table 100 and has fast upon its right hand end an arm 17$^b$ to which is connected the upper end of a rod 18 which carries at its lower end a slotted plate 18$^a$ which embraces the driving shaft A and carries a roller co-operating with the cam 19 fast upon the shaft. A spring 72' connected to an arm 17$^c$ projecting forward from the rock shaft 17, Fig. 27, yieldingly holds the slide 15 and parts moving with it in the position shown in Figs. 14 and 15, against the tension of which spring they are moved to the position shown in Fig. 18 to form the bail and drive its ends through the sides of the vessel. The slides 23 are connected by links 20, Figs. 10 and 27, to the upper ends of arms 20$^a$ fast upon a rock-shaft 22 journaled in bearings 22$^a$ depending from the table 100 and having fast upon it a rearwardly extending arm 22$^b$ to whose rear end is connected the upper end of a rod 24 guided at its lower end upon the driving shaft A and carrying a roller co-operating with a cam 25 fast upon the shaft. A suitable spring, not shown, yieldingly holds the parts in and returns them to normal position after they have been moved by the cam.

The groove in the portion of the block 12$^b$ intermediate the two wings 13 13, in which the body of the wire 11 lies, is normally closed, to prevent the wire falling out of the groove, by a backwardly and forwardly sliding guard plate 29 movably secured upon the block by screws passing through slots at its middle and at each end. A spring 31 coiled at its middle around the middle one of the screws and bearing at its ends against the front sides of pins 31$^a$ upon the opposite ends of the plate presses it rearward and tends to uncover the groove. The plate is held in forward position, over the groove, against the tension of said spring, by two bell-crank arms 30 30 pivoted upon the plate 12$^a$ at 30$^a$ and bearing against the rear sides of the pins 31$^a$. The rearwardly extending arms of these bell-cranks are provided upon their under sides with pins extending downward through slots in the plate 12$^a$ and resting against the sides of the links 14 14. When the latter are in normal position they hold the bell-cranks in the position shown in Fig. 14, but when the parts are moved to the position shown in Fig. 18, to form and attach the bail, the bell-cranks are free to rock upon their pivots and the spring 31 presses the plate 29 rearward and uncovers the groove to permit the bail to escape therefrom when the completed vessel is expelled from the bailing mechanism by the means to be now described.

From the bailing mechanism the completed vessels pass downward into the open upper end of a curved guide chute 34 through which they pass to the rear of the machine, Figs. 28 and 29. Arranged upon opposite sides of this chute are two vertically reciprocating spring arms 32 having reversely bent upper ends provided upon their lower portions with fingers or teeth adapted to catch over the upper edges of the side folds of the vessel and strip it off the plunger and pull it downward into the chute. These spring arms 32 are carried by the rear ends of arms 32$^a$ projecting from a cross-head 39 guided upon vertical rods 39$^a$ depending from the under side of the table 100 or casing inclosing the bailing mechanism. The cross-head 39 has pivoted to it the rear end of an arm 38 whose front end is hung by a link 38$^a$ to the under side of the table 100. A link 37 connects the arm 38 with the rear end of the horizontal arm of a bell-crank 36 whose opposite arm carries a roller resting upon a cam 35 fast upon the shaft A′. A spring 73 connected at its upper end to the under side of the table 100 and at its lower end to the link 37 pulls the latter upward and lifts the spring arms 32 when the cam 35 permits. The adjustment of the parts is such that while the plunger is descending to fold the blank, and while the bail is being formed and attached to the vessel, the position of the cam permits the spring 73 to hold the arms 32 in their uppermost position, Fig. 10, so that the descending plunger carries the folded vessel down between them and permits their fingers to catch over the upper edges of its side folds. Just after the bailing operation is completed the plunger begins to move upward and the cam 35 moves the arms 32 downward and they pull the completed vessel off the plunger and carry it downward with them. To insure the proper nesting of the vessels in the upper end of the chute 34 there are provided two sets of guide wires 71 72. The latter are simply straight wires interposed between the under side of the casing of the bailing mechanism and the front side of the upper end of the chute 34. The former are secured at their upper ends to the under side of the block 12$^b$ upon the under side of the plate 12, Figs. 14, 15 and 18, just in front of the groove in which the body of the bail wire lies, so that when the bail is formed and attached to the vessel the wires 71 stand between the bail and the rear side of the vessel. The wires 71 are supported only at their upper ends so that the bails are free to slide down over them as the vessels are carried downward by the arms 32 and to escape at last over the lower ends of the wires. The wires 71 thus serve to guide the bails and hold them in approximately horizontal position, so that the bail of each vessel is prevented from getting into the way of the next succeeding vessel and interfering with the nesting of the vessels one within another. Just above the upper end of the chute 34 the wires 71 are bent inwardly, to contract the passage between them and the wires 72. This serves to yieldingly obstruct the downward passage of the vessels and prevent their descending except when positively moved by the arms 32, and thereby prevents the vessels from becoming displaced from true position in their passage from the bailing mechanism to the chute and insures the fitting of the bottom of each vessel into the open top of the preceding one and the consequent proper and compact nesting of them.

The rectangular opening through the table 100 and casing of the bailing mechanism is provided at each side with a recess 33$^a$, Figs. 14 and 18, to accommodate the arms 32.

Figure 20:
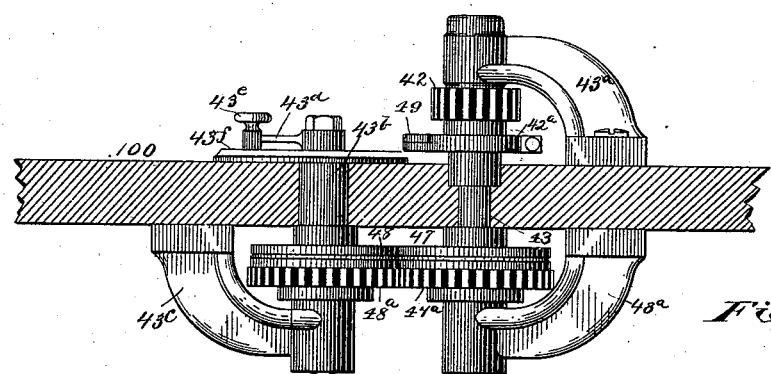
Figure 21:
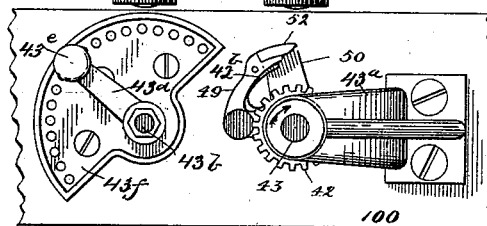
Figure 22:
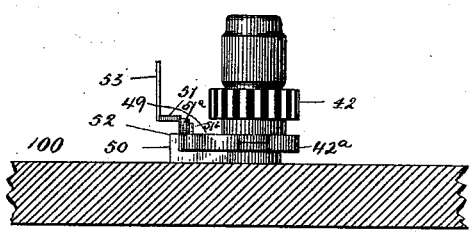
Figure 23:
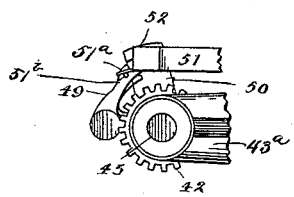

As heretofore stated the wire for the bails is drawn from the supply reel and delivered to the bailing mechanism by a pair of rollers 47 48, and the means for actuating and controlling said rollers may be now described, reference being had more particularly to Figs. 19 to 23, and 26. As seen in Fig. 20 the roller 47 is fast upon a vertical shaft 43 extending through the table 100 and having bearings at its upper and lower ends in arms 43$^a$ secured to the table. It is geared by gears 47$^a$ 48$^a$ to its co-operating roller 48 loose upon a shaft 43$^b$ also extending upward through the table 100 and having its bearings in the same and in an arm 43$^c$ secured to the under side of the table. The portion of the shaft 43$^b$ upon which the roller 48 is mounted is eccentric to its journals in the table 100 and arm 43$^c$, so that by turning the shaft in one direction or the other the roller 48 may be adjusted toward and from the roller 47, to accommodate wire of different sizes. The shaft $43^b$ has fast upon its upper end an arm $46^d$ which carries at its outer end a vertically movable pin $43^e$ adapted to co-operate with a series of perforations in a plate $43^f$, to lock the shaft in different adjusted positions. Loose upon the shaft 43 above the table 100 is a hub or sleeve having fast upon it a pinion 42 and a support $42^a$ for an arm 49 pivoted thereto and having a shoulder at its outer end adapted to co-operate with a lug 52 upon the outer end of an arm 50 fast upon the shaft 43. A spring $42^b$ bearing against the arm 49 presses it outward as far as its pivotal connection with its support $42^a$ will permit, in which position the shoulder at its outer end will contact with the lug 52 on the arm 50 when the pinion and parts moving with it are turned in the direction of the arrow, Fig. 21. The pinion meshes with a curved rack upon a lever 40, Fig. 19, pivoted to the table 100 at 41 and provided at its end opposite the rack with a vertically extending pin which passes through an opening in a sliding rod 45 guided at its front end in a post upon the table and provided at its rear end with a forked plate embracing the rotary shaft X and carrying a roller co-operating with a cam 46 fast upon said shaft. A coiled spring $44^a$ connected to the front end of the lever 40 yieldingly holds the parts in normal position, with the roller bearing against the cam. The result of this arrangement is that at each revolution of the shaft X the lever 40 will be rocked upon its pivot and the pinion 42 and parts moving with it oscillated forward and backward through a complete revolution. During the forward movement of the parts the arm 49, by its engagement with the lug 52 on the arm 50, will carry the shaft 43 with it and turn the rollers 47 48 to advance the wire. During the return movement of the pinion and arm the shaft and rollers will remain stationary, and as the rounded outer side of the arm engages the lug 52 the arm will yield on its pivot as it passes the lug and then spring out to the position shown in Fig. 21, ready to carry the arm 50 and shaft forward again.

The feeding of the blanks to the machine is of necessity occasionally interrupted from one cause or another. Thus where the automatic feeding devices are employed the feeding of the blanks will be interrupted, if the entire machine is not stopped, each time a new supply of blanks is placed upon the shelf G' and the latter adjusted to proper position. So, if the blanks are placed upon the carrier by hand, instead of by means of the picker arm, the attendant will occasionally fail to place a blank upon the carrier and the latter will reciprocate idly back and forth. Now, it is not desirable that the bail wire shall be fed into the machine and a bail be formed unless there is a folded blank in position upon the plunger for the bail to be applied to it, both because of the consequent waste of wire and because of the danger of such bails clogging up the machine. We have therefore devised means controlled by the blanks themselves for causing the wire-feeding devices to advance the wire only when a blank has been supplied to the folding and bailing mechanisms. Under the arrangement of parts which we have shown for this purpose in the drawings the wire-feeding devices may be said to be normally inoperative and to be thrown into operative relation or condition by the blank as it passes from the printing mechanism to the folding mechanism. The engagement of the arm 49 with the lug 52 of the arm 50 as before described serves to couple the actuating devices to the feed rollers. By preventing engagement of the arm with the lug the oscillating movements of the pinion and actuating devices will be idle and not affect the feed rollers. We therefore provide means for preventing engagement of the arm with the lug except at such times as blanks are supplied to the folding mechanism. This means consists of a movable guard normally preventing engagement of the arm and lug, but moved, to permit such engagement, by the passage of the blank from the printing to the folding mechanism. It is shown more particularly in Figs. 23 and 24, where it will be seen that a spring arm 51 secured at one end to the top of the table 100 carries at its opposite end a pendent curved plate $51^a$ adapted to co-operate, when the spring arm is in normal position, with a pin $51^b$ upon the upper side of the arm 49. At the return backward movement of the arm 49, after it has given the arm 50 and shaft 43 a forward revolution, the pin $51^b$ will strike the guard plate $51^a$ and the end of the arm 49 be forced inward and come to rest with its shoulder out of position to engage the lug 52. If, therefore, the arm 51 and plate $51^a$ are not raised and the end of the arm 49 thrown outward by its spring before the arm is turned forward again it will not carry the arm 50 and shaft with it and no wire will be fed into the machine. When the end of the arm 51 is lifted, as it may be, until the guard plate $51^a$ is carried above the pin $51^b$, the arm 49 will spring outward to position to engage the lug 52 and turn the feed rollers and advance the wire, as before described. We therefore provide means actuated by the blanks for lifting the arm 51 each time a blank is advanced from the printing mechanism to the folding mechanism. For this purpose the free end of the spring arm 51 has connected to it the lower end of a link 53 whose upper end is connected to the lower arm of a bell-crank 54 pivoted to the side of the right hand guideway M, Figs. 3, 19 and 24. A link 55 connects the upper arm of the bell-crank with the upper end of an arm $55^a$ fast upon the outer end of a short rock-shaft $55^b$ journaled in a bearing upon the under side of the right hand guideway M, Figs. 2, 3 and 31. The rock-shaft 55ᵇ has fast upon its inner end a vertically extending arm or finger 56 projecting upward through a slot in the guideway M and the bar 67 overlying the same, Figs. 2 and 3, into the path of the right hand flap of the blank resting at the printing point between the stop arms T T and catches Y Y. Immediately opposite the finger 56, upon a second short rock-shaft 56ᶜ, mounted in line with the shaft 55ᵇ in a bearing upon the under side of the left hand guideway M, is a second finger, 56ᵃ, projecting upwardly through slots in said guideway M and bar 67 above it and standing in the path of the left hand flap of the blank, Figs. 1 and 25. An arm 56ᵇ fast upon the outer end of the shaft 55ᶜ which carries the finger 56ᵃ is connected by a rearwardly extending link 55ᵈ to the upper end of an arm 55ᵉ fast upon the left hand end of a transverse rock-shaft 68' extending from one guideway M to the other and mounted in bearings upon their under sides. This shaft has fast upon its right hand side an arm 55', Fig. 3, whose upper end is pivoted to the link 55 intermediate the bell-crank 54 and the arm 55ᵃ which is connected to the finger 56. The result of this arrangement of parts is that as the blank is carried rearward from the position it occupies in Fig. 25 it will ride over and depress the fingers 56 and 56ᵃ, drawing rearward the link 55 and rocking the bell-crank 54 and thereby lifting the free end of the spring arm 51 and carrying the guard plate 51ᵃ above the pin 51ᵇ on the arm 49, Figs. 22, 23 and 24, so that the arm 49 in its forward movement may engage the lug 52 of the arm 50 and thereby couple the actuating devices to the feed rollers and advance the wire for the bail. When at any operation no blank is carried past the fingers 56 56ᵃ the spring arm 51 remains in normal position and no wire is fed to the bailing mechanism.

From the foregoing description of our machine it will be seen that the paper blanks are taken one by one from the supply pile and carried to the printing point, where each blank is momentarily arrested while the printing is being done. The blank is then carried on to position beneath the plunger and again comes to rest, whereupon the plunger descends and carries it downward between the folding cams and rollers and comes to rest with the folded vessel upon it ready to receive the wire bail. While these operations are taking place the wire-feeding devices deliver to the bailing mechanism the proper length of wire for a bail and it is cut off and its extreme opposite ends bent at right angles to its body. Then, the plunger having come to rest with the folded vessel in proper position, the two wings of the bailing mechanism are swung around against the opposite sides of the plunger and the wire bent into complete bail shape and its opposite ends driven through the side folds and sides of the vessel and clinched upon the inner surface thereof against the plunger, after which the vertically reciprocating ejecting arms are thrown downward and the completed vessel pulled off the plunger by them and carried down into the chute.

So far as we are aware we are the first in the art to devise an automatic machine for the manufacture of paper vessels having wire bails or handles; that is to say, the first to devise a machine by which the blanks are taken in the flat condition in which they come from the cutting machine and are automatically folded into vessel shape and the wire bails formed and applied to them without the employment of manual labor either in the folding or bailing operations or in the transmission of the folded blank from the one mechanism to the other. Such being the case we are therefore also the first to combine such mechanisms with an automatic blank-feeding mechanism, and with a printing mechanism either with or without the automatic feeding mechanism. Our invention in its broader scope therefore contemplates the combination of any sort of folding mechanism with any sort of bailing mechanism in such manner that the paper blanks may be supplied to the folding mechanism in flat unfolded condition and the completed bailed vessels be delivered from the bailing mechanism without any manual handling of the blanks after they are supplied to the folding mechanism. In addition to this combination the invention also includes the combination of the folding, feeding and printing mechanisms, the folding, bailing and wire-feeding mechanisms, and the folding, bailing, wire-feeding-and-controlling and blank-feeding mechanisms, as well as the other novel constructions, arrangements and combinations constituting the several individual sets of devices or mechanisms; all as will be set forth in our claims.

So far as concerns the controlling devices for the wire-feeding mechanism, by which the wire is caused to be fed to the bailing mechanism only when a blank has been supplied to it, we believe we are the first in the art to combine, with the wire-feeding mechanism, controlling means of any sort actuated by the moving blanks to cause or permit the wire to be fed to the bailing or wire-attaching mechanism only when a blank has been supplied to such mechanism. This feature of our invention may be employed in connection with machines for making other styles of paper vessels which are held in shape by wire fastening devices whether such fastening devices also serve the purpose of bails or handles or not.

The blank-feeding and printing mechanisms have been specifically covered by Patents Nos. 478,329 and 480,467, issued upon applications filed subsequently to and as divisions of the present one, and will be here claimed only in their co-operative relations with other mechanisms of the machine.

Having thus fully described our invention, we claim—

1. A machine for making paper vessels having wire bails or handles, consisting of folding mechanism by which flat previously unfolded blanks are folded into vessel shape, combined with bailing mechanism by which the wire bails are formed and attached to the folded vessels, whereby the blanks may be supplied to the folding mechanism in flat unfolded form and the completed bailed vessels delivered from the bailing mechanism without the interposition of manual labor, as described.

2. In a machine for the purpose described, the combination of folding mechanism for folding flat unfolded blanks into vessel shape, automatic feeding mechanism for supplying the blanks to the folding mechanism, and bailing mechanism for forming the wire bails and attaching them to the folded vessels, whereby the blanks may be automatically supplied to the folding mechanism in flat unfolded form and be folded and bailed and the completed vessels delivered from the machine.

3. In a machine for the purpose described, the combination of a folding mechanism, for folding flat unfolded blanks into vessel shape a printing mechanism, means for supplying the blanks to the printing mechanism and automatically advancing them to the folding mechanism after they have been printed, and bailing mechanism for forming the wire bails and attaching them to the folded vessels.

4. In a machine for the purpose described, the combination of a folding mechanism, for folding flat unfolded blanks into vessel shape a printing mechanism, automatic feeding mechanism for supplying the blanks to the printing mechanism and then advancing them to the folding mechanism, and a bailing mechanism for forming the wire bails and attaching them to the folded vessels.

5. In a machine for the purpose described, the combination of folding mechanism for folding flat unfolded blanks into vessel shape, wire-feeding mechanism for automatically advancing at each operation the proper length of wire for a bail, and bailing mechanism operating to cut off the wire, bend it into bail shape and attach it to the folded vessel.

6. In a machine for making paper vessels which are held in shape by wire fastening devices, the combination, with the blank-feeding devices, of a pair of co-operating rotary feeding disks or rollers for intermittently advancing the wire, actuating means therefor, and controlling devices for such actuating means, adapted to be struck by the blanks as they are advanced by the feeding devices, to cause the actuating devices to turn the feeding disks to advance the wire, whereby the wire is advanced only when blanks are supplied to the machine.

7. In a machine for making paper vessels which are held in shape by wire fastening devices, the combination, with the reciprocating blank-feeding carrier, of a pair of co-operating rotary feeding disks for intermittently advancing the wire, actuating means therefor, and controlling devices for such actuating means intermediate the same and the reciprocating blank-feeding carrier, adapted to be struck by the blanks as they are advanced by said carrier, to cause the actuating devices to turn the feeding disks to advance the wire, whereby the wire is advanced only when blanks are supplied to the machine.

8. In a machine for making paper vessels having wire bails or handles by which they may be carried and which also serve to hold the folded blank in vessel shape, the combination, with the reciprocating blank-feeding carrier, and the folding, bailing and wire-feeding mechanisms, of controlling devices for the wire-feeding mechanism adapted to be struck by the blanks as they are advanced by the carrier, to cause the wire-feeding mechanism to advance the wire, whereby the wire is fed to the bailing mechanism only when blanks are supplied to the machine.

9. In a machine for the purpose described, the combination, with the reciprocating blank-feeding carrier, and the folding, bailing and wire-feeding mechanisms, the latter mechanism normally inoperative or in inoperative position, of means actuated by the moving blanks to cause the wire-feeding mechanism to advance the wire to the bailing mechanism.

10. In a machine for the purpose described, the combination, with the blank-feeding carrier, and the folding, bailing and wire-feeding mechanisms, the wire-feeding mechanism being normally restrained from operation, of means actuated by the moving blanks and co-operating with the restraining means to permit operation of the wire-feeding mechanism when the blanks are advanced to the folding mechanism.

11. In a machine for the purpose described, the combination, with the blank-feeding, folding and bailing mechanisms, of the wire-feed rollers for advancing the wire to the bailing mechanism, reciprocating actuating devices therefor moving back and forth at each operation of the machine, coupling devices between such actuating devices and the rollers, and controlling means for such coupling devices actuated by the moving blanks to cause the wire to be supplied to the bailing mechanism only when the blanks are advanced by their feeding mechanism.

12. In a machine for the purpose described, the combination, with the blank-feeding, folding and bailing mechanisms, of the wire-feed rollers for advancing the wire to the bailing mechanisms, reciprocating actuating devices therefor moving back and forth at each operation of the machine, coupling devices between such actuating devices and feed rollers normally out of coupling position, and means actuated by the moving blanks to throw the coupling devices into position to couple the actuating devices to the rollers.

13. In a machine for the purpose described, the combination, with the blank-feeding, folding and bailing mechanisms, of the wire-feed rollers for advancing the wire to the bailing mechanism, reciprocating actuating devices therefor moving back and forth at each operation of the machine, coupling devices between such actuating devices and feed rollers normally out of coupling position but tending to move into such position, and restraining means for such coupling devices actuated by the moving blanks to permit operation of them when blanks are advanced by the blank-feeding mechanism.

14. A machine for automatically forming wire bailed paper vessels from flat previously unfolded blanks, consisting of a folding mechanism by which such flat previously unfolded blanks are folded into vessel shape, in combination with mechanism for automatically attaching wire bails to the folded vessels, whereby the completed vessels are automatically formed by the machine without the interposition of manual labor between the feeding of the flat unfolded blanks to the machine and the final attachment of the wire bails to the folded vessels, substantially as described.

15. A machine for automatically forming paper vessels from flat previously unfolded blanks, consisting of a folding mechanism by which such flat previously unfolded blanks are folded into vessel shape, in combination with a bailing mechanism for automatically forming the wire bails from a continuous strand of wire and attaching them to the folded vessels, substantially as described.

16. A machine for the automatic manufacture of wire-bailed paper vessels, consisting of a folding mechanism for folding flat previously unfolded blanks into vessel shape, bailing mechanism for forming the wire bails and attaching them to the folded vessels, and means for ejecting the completed vessels from the bailing mechanism, substantially as described.

17. A machine for the automatic manufacture of wire-bailed paper vessels, consisting of a folding mechanism for folding blanks into vessel shape, a bailing mechanism for forming and attaching the wire bails, and means for passing the blanks through said mechanisms, whereby the blanks may be fed to the folding mechanism and passed through the same and on through the bailing mechanism and the completed bailed vessels be automatically delivered from the machine without manual handling, substantially as described.

18. A machine for the automatic manufacture of wire-bailed paper vessels, consisting of a folding mechanism, a bail-forming and attaching mechanism located beneath the folding mechanism, and means for passing the blanks downward through the folding and bailing mechanisms, whereby the blanks may be fed to the folding mechanism at the top and the completed bailed vessels be delivered from the bailing mechanism at the bottom.

19. A machine for the automatic manufacture of wire-bailed paper vessels, consisting of a folding mechanism, a bail-forming and attaching mechanism located beneath the folding mechanism, a guide chute beneath said mechanisms, and means for passing the blanks downward through said mechanisms and automatically ejecting the completed vessels and nesting them in the guide chute.

20. In a machine for the purpose described, the combination, with the bailing mechanism for attaching the wire bails to the folded vessels, of means for passing the blanks through said mechanism, whereby they may enter it at one side and the completed vessels be automatically delivered from it at its opposite side.

21. In a machine for the purpose described, the combination, with the bailing mechanism, for attaching the wire bails to the folded vessels, of a guide chute beneath said mechanism, and means for automatically ejecting the completed vessels from the bailing mechanism and nesting them in said chute.

22. In a machine for the purpose described, the combination of a reciprocating plunger, means for folding the blanks into vessel shape around the plunger, bailing mechanism for forming the wire bails and attaching them to the folded vessels, and means for automatically moving the completed vessels on through the bailing mechanism and ejecting them from the machine.

23. In a machine for the automatic manufacture of wire-bailed paper vessels from flat previously unfolded blanks, the combination of a reciprocating plunger or male die, a cooperating set of folding devices beneath the same, for folding said flat previously unfolded blanks into vessel shape around the plunger, and bailing mechanism beneath the folding devices for forming the wire bails and attaching them to the blanks upon the plunger.

24. In a machine for the automatic manufacture of wire bailed paper vessels from flat previously unfolded blanks, the combination of a reciprocating plunger or male die, a cooperating set of folding devices beneath the same, for folding said flat previously unfolded blanks into vessel shape around the plunger, bailing mechanism beneath the folding devices for forming the wire bails and attaching them to the folded blanks upon the plunger, and means for automatically ejecting the completed vessels, substantially as described.

25. In a machine for the automatic manufacture of wire-bailed paper vessels from flat previously unfolded blanks, the combination of a reciprocating plunger or male die, a cooperating set of folding devices beneath the same for folding said flat previously unfolded blanks into vessel shape around the plunger, a bailing mechanism beneath the folding devices for forming the wire bails and attaching them to the folded blanks upon the plunger, a guide chute beneath the bailing mechanism, and means for automatically ejecting the completed vessels and nesting them in said chute, substantially as described.

26. In a machine for the purpose described, the combination of a reciprocating plunger, a co-operating set of folding devices beneath the same, for folding the blank into vessel shape, bailing mechanism beneath the folding devices, for forming the wire bail and attaching it to the folded vessel upon the plunger, a guideway or chute beneath the bailing mechanism, and means for removing the vessels from the plunger and nesting them in said chute.

27. In a machine for the automatic manufacture of wire bailed paper vessels from flat previously unfolded blanks, the combination of a reciprocating plunger, a co-operating set of folding devices beneath the same for folding the flat previously unfolded blanks into vessel shape, a reciprocating carrier for moving said blanks one by one beneath the plunger, and bailing mechanism beneath the folding devices for forming the wire-bails and attaching them to the folded vessels upon the plunger.

28. In a machine for the automatic manufacture of wire bailed paper vessels from flat previously unfolded blanks, the combination of a reciprocating plunger, a co-operating set of folding devices beneath the same, for folding the flat previously unfolded blanks into vessel shape, a reciprocating carrier for moving said blanks one by one beneath the plunger, bailing mechanism beneath the folding devices for forming the wire bails and attaching them to the folded vessels, and means for automatically ejecting the completed vessels from the bailing mechanism.

29. In a machine for the automatic manufacture of wire-bailed paper vessels from flat previously unfolded blanks, the combination of a reciprocating plunger, a co-operating set of folding devices beneath the same, for folding the flat previously unfolded blanks into vessel shape, a reciprocating carrier for moving said blanks one by one beneath the plunger, bailing mechanism beneath the folding devices for forming the wire bails and attaching them to the folded vessels, a guide chute beneath the bailing mechanism, and means for automatically ejecting the completed vessels from the bailing mechanism and nesting them in said chute.

30. In a machine for the purpose described, the combination of a reciprocating plunger, a co-operating set of folding devices beneath the same, for folding flat previously unfolded blanks into vessel shape, a reciprocating carrier for moving the blanks beneath the plunger, automatic means for lifting the blanks one by one from a pile and placing them upon the carrier, and bailing mechanism beneath the folding devices for forming the wire bail and attaching it to the folded vessel upon the plunger.

31. In a machine for the purpose described, the combination of a reciprocating plunger, a co-operating set of folding cams or jaws beneath the same for folding the four sides of the vessel up against the plunger, means for then bending the corner folds of the vessel over upon each other on its opposite sides, bailing mechanism beneath the folding devices for forming the wire bail and driving its opposite ends through said overlapped folds and the sides of the vessel while the latter is held upon the plunger, and means for automatically ejecting the completed vessel.

32. In a folding mechanism, the combination, with the reciprocating plunger and means co-operating therewith to fold up the sides of the vessel against the plunger, of the spiral cams at the four corners of the plunger for bending the corner folds of the vessel over upon each other upon opposite sides of the plunger.

33. In a folding mechanism, the combination, with the reciprocating plunger and means co-operating therewith to fold up the sides of the vessel against the plunger, the spiral cams at the four corners of the plunger for bending the corner folds of the vessel over upon each other on opposite sides of the plunger, and the fingers at opposite sides of the plunger for holding in check one fold while the other is bent down beneath it.

34. In a machine such as described, the combination, with the reciprocating plunger and the folding and bailing mechanisms co-operating therewith, of the guideway or chute beneath the bailing mechanism, and the reciprocating arms for removing the vessels from the plunger and nesting them in the chute.

35. In a machine such as described, the combination, with the reciprocating plunger and the folding and bailing mechanisms co-operating therewith, of the guideway or chute beneath the bailing mechanism, the guide wires depending from the bailing mechanism between the bails and vessels and serving to hold the bails in position in the passage of the vessels from the bailing mechanism to the chute, and the reciprocating arms for removing the vessels from the plunger and nesting them in the chute.

36. In a machine such as described, the combination, with the reciprocating plunger and the folding and bailing mechanisms co-operating therewith, of the guideway or chute beneath the bailing mechanism, the guide wires extending from the front side of the chute to the under side of the bailing mechanism, the wires depending from the bailing mechanism at the rear side of the chute, between the bails and vessels, one of said sets of wires being bent inward at a point between the chute and bailing mechanism, and the reciprocating arms for removing the vessels from the plunger and carrying them downward between the two sets of wires to the upper end of the chute.

37. In a bail-forming mechanism, the combination of a fixed plate having a groove in which the middle portion of the wire for the bail lies, with its opposite ends projecting beyond the ends of the plate, means for bending the extreme opposite ends of the wire to form the short attaching portions of the bail, and a pair of wings hinged at fixed points at the opposite ends of the plate and adapted to be swung around at right angles to the groove therein to bend the wire into bail shape.

38. In a bail-forming mechanism, the combination of a fixed plate having a groove in which the middle portion of the wire for the bail lies, with its ends projecting beyond the ends of the plates, means for bending the extreme opposite ends of the wire to form the short attaching portions of the bail, and a pair of wings hinged at the opposite ends of the plate and having grooves in which the ends of the wire projecting beyond the fixed plate lie, said wings being adapted to be swung around at right angles to the groove in the fixed plate, to bend the wire into bail shape.

39. In a bail-forming mechanism, the combination of a fixed plate having a groove in which the middle portion of the wire for the bail lies, with its ends projecting beyond the ends of the plate, a pair of movable blocks around which the extreme opposite ends of the wire are bent, a pair of slides co-operating with said blocks to so bend the wire, means for moving said blocks out of the plane of the wire after its ends are so bent, and means for bending the portions of the wire projecting beyond the ends of the fixed plate at right angles to the groove therein, to bring the wire to bail shape.

40. In a bail-forming mechanism, the combination of a fixed plate having a groove in which the middle portion of the wire for the bail lies, with its ends projecting beyond the ends of the plate, a pair of movable blocks around which the extreme opposite ends of the wire are bent, a pair of slides co-operating with said blocks to so bend the wire, means actuated by the slides to move the blocks out of the plane of the wire after its ends are so bent, and means for bending the portions of the wire projecting beyond the fixed plate at right angles to the groove therein, to bring the wire to bail shape.

41. In a bail-forming mechanism, the combination of a fixed plate having a groove in which the middle portion of the wire for the bail lies, with its ends projecting beyond the ends of the plate, a pair of blocks carried by a pair of spring arms and normally standing in the path of the extreme opposite ends of the wire, around which blocks said ends of the wire are bent to form the short attaching portions of the bail, a pair of slides co-operating with the blocks to so bend the wire, a pair of wedges carried by the slides and co-operating with the spring arms to move the blocks out of the path of the wire after its ends have been bent around them, and means for bending the portions of the wire projecting beyond the fixed plate at right angles to the groove therein, to bring the wire to bail shape.

42. In a bail-forming mechanism, the combination of a fixed plate having a groove in which the middle portion of the wire for the bail lies, with its ends projecting beyond the ends of the plate, a pair of movable blocks around which the extreme opposite ends of the wire are bent to form the short attaching portions of the bail, a pair of slides co-operating with the blocks to so bend the wire, means for moving said blocks out of the path of the wire after its ends are so bent, and a pair of wings hinged at the opposite ends of the plate and adapted to be swung around at right angles to the groove therein to bend the wire into bail shape.

43. In a bail-forming mechanism, the combination of a fixed plate having a groove in which the middle portion of the wire for the bail lies, with its ends projecting beyond the ends of the plate, a pair of blocks carried by a pair of spring arms and normally standing in the path of the extreme opposite ends of the wire, around which blocks said ends of the wire are bent to form the short attaching portion of the bail, a pair of slides co-operating with the blocks to so bend the wire, a pair of wedges carried by the slides and co-operating with the spring arms to move the blocks out of the path of the wire after its ends have been so bent, and a pair of wings hinged at the opposite ends of the fixed plate and adapted to be swung around at right angles to the groove therein to bend the wire into bail shape.

44. In a bail-forming mechanism, the combination of a fixed plate having a groove in which the middle portion of the wire for the bail lies, with its ends projecting beyond the ends of the plate, a movable guard for holding the wire in the groove while the bail is being formed, means for bending the wire into bail shape, and means for then moving the guard to release the bail from the groove.

45. In a bail-forming mechanism, the combination of a fixed plate having a groove in which the middle portion of the wire for the bail lies, with its ends projecting beyond the ends of the plate, a movable guard for holding the wire in the groove while the bail is being formed, and means operated by the bending devices to move the guard and release the bail from the groove.

46. In a bail-forming mechanism, the combination of a fixed plate having a groove in which the middle portion of the wire for the bail lies, with its ends projecting beyond the ends of the plate, a movable guard for holding the wire in the groove, a spring tending to move the guard away from the groove, restraining devices for holding the guard in place against the tension of the spring, and means for bending the wire into bail shape co-operating with said restraining means to release the guard and permit the spring to move it away from the groove after the bail has been formed.

47. In a wire-feeding mechanism, the combination of the rotary shaft 43 carrying the roller 47, the co-operating roller 48 geared thereto, the arm 50 fast upon the shaft 43 and having the lug 52, the oscillatory support 42ª loose upon the shaft 43, with means for oscillating it, and the actuating arm 49 pivoted to the support 42ª and yieldingly held in position to co-operate with the lug 52 of the arm 50 in the manner described.

48. In a machine for making paper vessels, embodying a blank-feeding and a wire-feeding mechanism, the combination, with the oscillating actuating arm 49 of the wire-feeding mechanism, and the arm 50 co-operating therewith, of the movable guard 51ª, and means actuated by the blanks as they are advanced by the blank-feeding mechanism to move the guard 51ª out of the path of the arm 49 and permit its co-operation with the arm 50, for the purpose described.

49. In a machine for making paper vessels, embodying blank-feeding and wire-feeding mechanisms, the combination, with the oscillating actuating arm 49 of the wire-feeding mechanism and the arm 50 with which it co-operates, of the spring arm 51, and guard 51ª carried thereby and co-operating with the arm 49 to prevent engagement of it with the arm 50, and means actuated by the blanks as they are advanced by the blank-feeding mechanism to move the guard 50 out of the path of the arm 49 and permit its co-operation with the arm 50, for the purpose described.

50. The combination, with the reciprocating plunger and the folding devices co-operating therewith, of the fixed plates 10 arranged above the folding devices and extending inwardly and downwardly toward the path of the plunger and operating to support and steady the blank as it is carried downward by the plunger.

51. The combination of the stationary grooved plate 12ᵇ, receiving the wire 11, the wings 13 13 each having a groove in its face and pivoted to the plate 12ᵇ, the slide 15, the links 14 connecting it with the wings, the rock-shaft 17, the link 16 connecting the slide 15 to the arm 16ª upon said shaft, the rod 18 connected to an arm 17ᵇ upon said shaft, and the cam 19 upon the driving shaft co-operating with a roller carried by the rod 18, substantially as described.

Toronto, December 24, 1890.

JAMES W. HUTT.
ARTHUR J. PHILLIPS.

In presence of—
 CHARLES C. BALDWIN,
 JOHN E. CAMERON.